US00RE43778E

(19) United States
(12) Reissued Patent
Nimura et al.

(10) Patent Number: US RE43,778 E
(45) Date of Reissued Patent: Oct. 30, 2012

(54) PRINTING APPARATUS AND PRINTING METHOD USING A PLURALITY OF PRINTERS AND WHICH DISTRIBUTES A PRINT JOB IN ACCORDANCE WITH A REMAINING AMOUNT OF AN EXPENDABLE SUPPLY IN EACH PRINTER

(75) Inventors: Wataru Nimura, Tokyo (JP); Takahiro Mizushina, Saitama (JP); Hiroki Takahashi, Tokyo (JP); Takeshi Kasahara, Tokyo (JP); Kimiyasu Mizuno, Tokyo (JP)

(73) Assignee: Casio Computer Co., Ltd., Tokyo (JP)

(21) Appl. No.: 12/330,788

(22) Filed: Dec. 9, 2008

Related U.S. Patent Documents

Reissue of:
(64) Patent No.: 7,154,630
Issued: Dec. 26, 2006
Appl. No.: 09/762,560
PCT Filed: Jun. 29, 2000
PCT No.: PCT/JP00/04281
§ 371 (c)(1),
(2), (4) Date: Feb. 9, 2001
PCT Pub. No.: WO01/01669
PCT Pub. Date: Jan. 4, 2001

(30) Foreign Application Priority Data

Jun. 29, 1999 (JP) ..... 11-182936
Dec. 14, 1999 (JP) ..... 11-353865

(51) Int. Cl.
*G06F 15/00* (2006.01)

(52) U.S. Cl. ..... 358/1.15; 358/1.18; 358/296; 358/400; 400/61

(58) Field of Classification Search ..... 358/1.18, 358/296, 400, 407, 488, 1.15, 302; 379/100.17; 101/484; 400/61, 70
See application file for complete search history.

(56) References Cited

U.S. PATENT DOCUMENTS 4,587,532 A * 5/1986 Asano ..... 346/134
5,034,806 A 7/1991 Ikeda et al.
5,181,162 A 1/1993 Smith et al.
5,208,640 A 5/1993 Horie et al.

(Continued)

FOREIGN PATENT DOCUMENTS

EP 0 326 515 A1 8/1989

(Continued)

OTHER PUBLICATIONS

First Office Action issued in counterpart Chinese patent application No. 00801199.0. English language translation enclosed.

(Continued)

*Primary Examiner* — Benny Q Tieu
*Assistant Examiner* — Qian Yang
(74) *Attorney, Agent, or Firm* — Holtz, Holtz, Goodman & Chick, PC

(57) ABSTRACT

A photographic print vending apparatus is provided which comprises a media accepting unit which accepts a recording medium having photographic image information stored thereon. An image information reader reads the image information from the recording medium, and a plurality of printers print images based on image data from a processor connected to the image information reader and an advertisement information storage unit. When an advertisement printing mode is set, the processor reads the advertisement information from the advertisement information storage unit, synthesizes the read advertisement information and the image information read by the image information reader, and supplies the synthesized information to the printers as image data.

29 Claims, 25 Drawing Sheets

U.S. PATENT DOCUMENTS

| | | | | |
|---|---|---|---|---|
| 5,513,254 | A * | 4/1996 | Markowitz | 379/100.17 |
| 5,664,253 | A * | 9/1997 | Meyers | 396/603 |
| 5,698,832 | A * | 12/1997 | Someya et al. | 235/449 |
| 5,707,158 | A | 1/1998 | Hansel et al. | |
| 5,724,521 | A | 3/1998 | Dedrick | |
| 5,740,549 | A | 4/1998 | Reilly et al. | |
| 5,765,142 | A | 6/1998 | Allred et al. | |
| 5,781,205 | A * | 7/1998 | Silverbrook | 347/17 |
| 5,845,262 | A * | 12/1998 | Nozue et al. | 705/26 |
| 5,859,711 | A * | 1/1999 | Barry et al. | 358/296 |
| 5,979,757 | A | 11/1999 | Tracy et al. | |
| 6,014,137 | A | 1/2000 | Burns | |
| 6,018,774 | A | 1/2000 | Mayle et al. | |
| 6,073,241 | A | 6/2000 | Rosenberg et al. | |
| 6,198,544 | B1 * | 3/2001 | Wess et al. | 358/296 |
| 6,219,148 | B1 * | 4/2001 | Takashima | 358/1.15 |
| 6,295,482 | B1 | 9/2001 | Tognazzini | |
| 6,320,672 | B1 | 11/2001 | Itoh | |
| 6,334,109 | B1 | 12/2001 | Kanevsky et al. | |
| 6,353,484 | B1 * | 3/2002 | Takashima | 358/1.15 |
| 6,367,653 | B1 | 4/2002 | Ruskin et al. | |
| 6,518,971 | B1 * | 2/2003 | Pesto et al. | 345/505 |
| 6,655,284 | B1 * | 12/2003 | Hoshii et al. | 101/484 |
| 6,657,741 | B1 * | 12/2003 | Barry et al. | 358/1.15 |
| 2001/0014868 | A1 | 8/2001 | Herz et al. | |
| 2001/0016829 | A1 | 8/2001 | Toshikage et al. | |
| 2001/0030773 | A1 | 10/2001 | Matsuura et al. | |

FOREIGN PATENT DOCUMENTS

| | | | |
|---|---|---|---|
| EP | 0 588 513 | A2 | 3/1994 |
| EP | 633686 | A2 * | 1/1995 |
| EP | 0 649 109 | A1 | 4/1995 |
| EP | 0 854 458 | A2 | 7/1998 |
| FR | 2 665 812 | A1 | 2/1992 |
| FR | 0 682 502 | A | 4/1993 |
| FR | 2 741 987 | A1 | 6/1997 |
| GB | 2 305 259 | A | 4/1997 |
| JP | 52-042196 | A | 4/1977 |
| JP | 53-070438 | A | 6/1978 |
| JP | 57-105380 | A | 6/1982 |
| JP | 61-83374 | A | 6/1986 |
| JP | 03-092367 | A | 4/1991 |
| JP | 03-221482 | A | 9/1991 |
| JP | 04-112057 | A | 4/1992 |
| JP | 04-287113 | A | 10/1992 |
| JP | 05-06935 | A | 3/1993 |
| JP | 06-008537 | A | 1/1994 |
| JP | 06-040182 | A | 2/1994 |
| JP | 07-107424 | A | 4/1995 |
| JP | 08-217289 | A | 8/1996 |
| JP | 08-337011 | A | 12/1996 |
| JP | 09-070001 | A | 3/1997 |
| JP | 10-181163 | A | 7/1998 |
| JP | 10-210208 | A | 8/1998 |
| JP | 10-215376 | A | 8/1998 |
| JP | 10-233984 | A | 9/1998 |
| JP | 10-320145 | A | 12/1998 |
| JP | 10-326375 | A | 12/1998 |
| JP | 11-015617 | A | 1/1999 |
| JP | 11-024860 | A | 1/1999 |
| JP | 11-039107 | A | 2/1999 |
| JP | 11-084523 | A | 3/1999 |
| JP | 11-320987 | A | 11/1999 |
| JP | 11-355549 | A | 12/1999 |
| JP | 2000188741 | A | 7/2000 |
| JP | 2001010149 | A | 1/2001 |
| JP | 2002133141 | A | 5/2002 |
| KR | 2001035449 | | 5/2001 |
| KR | 2001068106 | | 7/2001 |
| WO | WO 93/16443 | A1 | 8/1993 |
| WO | WO 98/40826 | A2 | 9/1998 |

OTHER PUBLICATIONS

Second Office Action issued in counterpart Chinese patent application No. 00801199.0. English language translation enclosed.

European Communication dated Oct. 18, 2011 (in English) in counterpart European Application No. 00942390.6.

Patent Abstracts of Japan, vol. 1998, No. 13, Nov. 30, 1998; & JP 10 215376 A (Fuji Photo Film Co., Ltd.) Aug. 11, 1998.

U.S. Appl. No. 09/958,062, abandoned, application as filed.

U.S. Appl. No. 09/958,081, abandoned, application as filed.

* cited by examiner

| | | |
|---|---|---|
| IMAGE No. (1) | : 1, 2, 3, 4, 5, 6, 7, 8, 9, 10 | |
| PRINT QUANTITY (Q) | : 1, 1, 1, 1, 1, 2, 1, 2, 1, 3 | TOTAL 14 |
| DESIGNATED QUANTITY (N) | : (14) | |
| AVAILABLE PRINTERS ($P_{MAX}$) | : (8) | |
| COUNTER (CNT) | : | |

PRINTING APPARATUS AND PRINTING METHOD USING A PLURALITY OF PRINTERS AND WHICH DISTRIBUTES A PRINT JOB IN ACCORDANCE WITH A REMAINING AMOUNT OF AN EXPENDABLE SUPPLY IN EACH PRINTER

Matter enclosed in heavy brackets [ ] appears in the original patent but forms no part of this reissue specification; matter printed in italics indicates the additions made by reissue.

CROSS REFERENCE TO RELATED APPLICATION

This application is a U.S. National Phase Application under 35 USC 371 of International Application PCT/JP00/04281 (published in English) filed Jun. 29, 2000.

TECHNICAL FIELD

The present invention relates an apparatus and method for printing digital images, more particularly to an apparatus and method for printing a digital image with synthesizing an advertisement image.

The present invention also relates to a printing apparatus having a plurality of printers each comprising an image forming unit and a printing mechanism, and a method of printing with using the printing apparatus.

BACKGROUND ART

To develop filmed photo, a user usually brings a film to a photo processing shop.

Digital devices such as a digital camera and a scanner have been spread to personal use. Images captured or scanned by such the digital device are printed by, for example, a printer connected to a personal computer. Since digital images can be recorded on a recording medium, a photo processing shop which can handle digital images also processes the digital data to print the images.

The above described conventional methods for developing images have the following problems.

Since filmed photo must be developed at a photo processing shop, it takes a long time to develop photos.

Although digital images can be printed by a personal printer, such the personal printer is usually a low-end one. Therefore, it is difficult to realize high quality and high speed printing in home.

A photo processing shop which can handle digital images can print the images with high quality, however, it also takes a long time to image developing as well as the case of film photo developing.

Regardless of filmed image or digital image, image processing for printing costs a user. For example, a photo processing shop requires fees for developing and printing services, and a personal printer costs for expendable supplies such as paper and inks.

For high speed printing, various printing apparatuses have been developed. One of them is a printing apparatus equipped with a plurality of printing mechanisms.

FIG. 29 is a diagram showing the system structure of a conventional printing apparatus having a plurality of printing mechanisms. As shown in FIG. 29, a printing apparatus 190 comprises an interface (I/F) 191, a storage unit 192, a main controller 193, and a plurality of printing mechanisms 194.

The I/F 191 receives print information and outputs it to the main controller 193. The main controller 193 stores the print information in the storage unit 192 once. The main controller 193 reads the print information from the storage unit 192 at predetermined timing, prepares image data based on the read print information, and transfers the image data to any of the plurality of printing mechanisms 194. The printing mechanism 194 performs printing on a sheet in accordance with the received image data. Thus, the printing mechanisms 194 of the printing apparatus 190 perform printing in parallel.

Since the image data preparation depends only on the main controller 193 and the prepared image data set is transferred to any of the plural printing mechanisms 194, it is not able to prepare and transfer further image data relating to next print information during image data preparation for the currently processed print information.

If several sets of the print data are supplied to the printing apparatus 190, it takes a long time to process them, therefore, it is difficult to realize high speed printing even if the apparatus is equipped with a plurality of printing mechanisms.

DISCLOSURE OF INVENTION

It is an object of the present invention to provide an apparatus and a method for printing which realize high resolution digital image printing within a short time while reducing costs.

It is another object of the present invention to provide a printing apparatus which is equipped with a plurality of printers each having an image forming unit and a printing mechanism to realize high speed printing, and a printing method.

To accomplish the above objects, a printing apparatus according to a first aspect of the present invention is a printing apparatus (1, 101) which comprises image information read means (3, 104) for reading image information, and print means (14, 123) for printing the image information read by the image information read means (3, 104) on a sheet (18, 153), wherein the printing apparatus (1, 101) comprises advertisement information storing means (8, 131) for storing advertisement information, and the print means (14, 123) prints the image information read by the image information read means (3, 104) on the sheet (18, 153) together with the advertisement information stored in the advertisement information storing means (8, 131).

The apparatus (1, 101) according to the first aspect further comprises price option selecting means (2, 102, 103) for allowing a user to select price options for printing the image information, wherein the print means (14, 123) prints the image information read by the image information read means (3, 104) on the sheet (18, 153) together with the advertisement information stored in the advertisement information storing means (8, 131) in accordance with the selection of the price option selecting means (2, 102, 103).

According to the above structure, the printing apparatus prints the advertisement information on the sheet together with the image information, therefore, the advertiser bears full or part of print cost. Therefore, a user obtains printed images, especially digital images at a low cost. The payment selecting means allows the user to optionally pay full cost to obtain resultant prints which are occupied by the image information.

The apparatus (1, 101) according to the first aspect, wherein the image information includes plural sets of unit images information, the printing apparatus (1, 101) further comprises unit image selecting means (2, 102, 103) for selecting a set of unit image information desired by the user from the plural sets of the unit images information, the print means (14, 123) prints the set of the unit image information selected by the unit image selecting means (2, 102, 103) on the sheet (18, 153) together with the advertisement image stored in the advertisement image storing means (8, 131).

In this case, the user can select desired ones from images captured by, for example, a digital camera to print them.

The apparatus (1, 101) according to the first aspect further comprises advertisement information receiving means (13, 138) for receiving advertisement information supplied from a remote site (6c, 139c) via a communication network (6b, 139b), wherein the advertisement information storing means (8, 131) stores the advertisement information received by the advertisement information receiving means (13, 138).

This structure is helpful for the advertiser to establish effective advertising strategy, because the advertisement information is alterable in accordance with the circumstances.

The apparatus (1, 101) according to the first aspect further comprises:

inside status detection means (7, 130) for detecting status inside the print means (14, 123); and notification means (13, 138) for notifying the remote site (6c, 139c) of the inside status detected by the inside status detection means (7, 130).

According to this structure, an administrator is immediately informed of status of the printing apparatus such as malfunction or expendable supply exhaustion, even if the printing apparatus is settled as an unmanned automatic vending machine. This effect is helpful for the administrator's prompt action, as a result, business hours of the printing apparatus will be substantially elongated.

The apparatus (1, 101) according to the first aspect, wherein the print means (14, 123) comprises a plurality of printers (14-1 to 14-8, 123-1 to 123-8) each able to print the image information read by the image information read means (3, 104) on the sheet (18, 153), and the printing apparatus (1, 101) further comprises image information distribution means (7, 130) for distributing image information read by the image information read means (3, 104) to any of the plural printers (123-1 to 123-8) in accordance with a predetermined standard.

Such the multiple printer structure allows the printing apparatus to perform parallel printing, thus, a user can obtain resultant prints within less waiting time.

The apparatus (1, 101) according to the first aspect, wherein the image information includes plural sets of unit images information, the printing apparatus (1, 101) further comprises unit image selecting means (2, 102, 103) for selecting a set of unit image information desired by the user from the plural sets of the unit images information, and the image information distribution means (7, 130) distributes the unit image information sets selected by the unit image selecting means (2, 102, 103) to any of the plural printers (123-1 to 123-8) in accordance with selecting order.

The apparatus (1, 101) according to the first aspect further comprises eject means (121) for conveying the sheet (18, 153) on which the image information is printed by each of the plural printers (14-1 to 14-8, 123-1 to 123-8) so as to be ejected through an outlet (112).

The eject means gathers the plural resultant prints output by the plural printers, at an outlet. Thus, it is easy for the user to pick up the plural prints on each of which image information is printed at once. The eject means also can sort the plural resultant prints in order of selection by the unit image selecting means.

The apparatus (1, 101) according to the first aspect, wherein the image information read means (3, 104) accept a detachably applied recording medium, and read the image information from the applied recording medium.

The apparatus (1, 101) according to the first aspect, wherein the image information read means (3, 104) has an attachment for accepting the recording medium, which is slanted so that an opening of the attachment directs downward.

According to this structure where image information sets are read from a recording medium to print them on sheets, images captured by, for example, a digital still camera may be stored on a flash memory or the like, and a user can print the stored images with using the printing apparatus. The user does not need to own a printer for printing the image information. Since the media slot of the printing apparatus is slanted so that an opening thereof directs downward, it prevents dust from sticking on connection between the recording medium and the image information read means. This structure is helpful for the printing apparatus to have dust resistant structure which is effective in outdoor use.

The apparatus (1, 101) according to the first aspect, wherein the print means (14, 123) comprises sublimation thermal printers.

Since the sublimation thermal printers are used, a user can obtain high quality prints as well as film prints.

To accomplish the above objects, a printing apparatus according to a second aspect of the present invention is a printing apparatus (101) which comprises a plurality of printers (123-1 to 123-8) each of which is able to print images on sheets (158) in accordance with input print information representing guidance for printing images, wherein the printing apparatus (101) comprises print information distribution means (130) for distributing input print information to any of the plural printers (123-1 to 123-8) in accordance with a predetermined standard, each of the plural printers (123-1 to 123-8) comprises:

image data generating means (140) for generating image data to be printed, based on the print information distributed by the print information distribution means (130); and print means (143) for printing the image data generated by the image data generating means (140) on the sheet (153).

According to the printing apparatus, the plural printers executes printing in parallel, thus, the printing apparatus realizes high speed printing.

The apparatus (101) according to the second aspect further comprises inside status detection means (130) for detecting inside status of each of the plural printers (123-1 to 123-8), wherein the print information distribution means (130) distributes the print information to any of the printers (123-1 to 123-8) in accordance with the detection results of the inside status detection means.

The apparatus (101) according to the second aspect, wherein the inside status detection means (130) detects remainders of an expendable supply (153) in each of the printers (123-1 to 123-8), and the print information distribution means (130) distributes the print information prior to the printers whose expendable supplies have enough remainders for printing.

In this case, exhaustions of the expendable supplies in the printers are equalized. This effect is helpful for an administrator in case of exchanging the exhausted supplies in the printing apparatus which is settled as an unmanned automatic vending machine, because it allows the administrator to exchange all supplies at once.

The apparatus (101) according to the second aspect, wherein order information is applied to each of the plural printers (123-1 to 123-8), the inside status detection means (130) detects remainders of an expendable supply (153) in each of the printers (123-1 to 123-8), and the print information distribution means (130) distributes the print information to the printers in accordance with the order information and the detection result of the inside status detection means (130) in order of remainders quantity so that the print information is distributed first to one of the printers (123-1 to 123-8) which has the least remainders of the expendable supply.

In this case, specific ones of the plural printers are frequently used, thus, expendable supplies therein will be exhausted earlier. Accordingly, timings for exchanging the supplies are offset printer by printer, therefore, a time period occupied for exchanging the supplies will be reduced each time. As a result, users' waiting time for the supply exchange will be reduced, thus, the printing apparatus will be operated efficiently.

The apparatus (101) according to the second aspect, wherein the inside status detection means (130) detects remainders of an expendable supply (153) in each of the printers (123-1 to 123-8), the printing apparatus (101) further comprises:

print quantity designation means (102, 103) for designating print quantity instructed by a user;

remainders comparing means (130) for comparing required remainders necessary for the print quantity designated by the print quantity designation means (102, 103) with the remainders of the expendable supplies (153) detected by the inside status detection means (130); and warning means (102) for warning print capacity shortage in a case where the comparison by the remainders comparing means (130) results that the remainders of the expendable supplies (153) is less than the required remainders.

The apparatus (101) according to the second aspect, wherein the print quantity designation means (102, 103) designates print quantity by unit amount, and the printing apparatus (101) further comprises designation cancel means (130) for canceling the print quantity designation by the unit amount to be carried out by the print quantity designation means (102, 103) based on the result of the remainders comparing means (130).

This structure allows a user to avoid unnecessary extra operations that indicating unable printing operations.

The apparatus (101) according to the second aspect, wherein the plural printers (123-1 to 123-8) are grouped into a plurality of groups each including at least one of the printers, and the print information distribution means (130) distributes the print information to any of the printers (123-1 to 123-8) group by group.

According to the above structure where the printers are grouped, for example, a plurality of users can share the printers group by group, thus, they can indicate printing simultaneously. Providing each printer group with a print outlet directs the resultant prints to target users.

The apparatus (101) according to the second aspect, wherein the plural printers (123-1 to 123-8) have different types of the sheets for printing the image, the printing apparatus (101) comprise sheet selecting means (102, 103) for selecting sheet type corresponding to the user's demand, and the print information distribution means (130) distributes the print information to any of the printers corresponding to the sheet type selected by the sheet selecting means.

Such the printing apparatus is compatible with multiple sheet types, therefore, a user can select desired sheet type.

The apparatus (101) according to the second aspect further comprises:

inside status detection means (130) for detecting the status in each of the plural printers (123-1 to 123-8); and notification means (138) for notifying a remote site (139c) of the inside status detected by the inside status detection means.

The apparatus (101) according to the second aspect, wherein each of the plural printers (123-1 to 123-8) has its own ID information, and the notification means (138) informs the remote site (139c) of the inside status of the printers (123-1 to 123-8) detected by the inside status detection means (130) together with the ID information of the printers (123-1 to 123-8).

Since the printing apparatus comprises the notification means, an administrator is immediately notified of status of the printing apparatus such as malfunction or supply exhaustion in the printing apparatus which is settled as an unmanned automatic vending machine. This effect is helpful for the administrator's prompt action. As a result, the operation time of the printing apparatus will be substantially extended.

The apparatus (101) according to the second aspect further comprises eject means (121) for conveying the sheet (153) on which the image information is printed by each of the plural printers (123-1 to 123-8) so as to be ejected through an outlet (112).

The eject means gathers the plural resultant prints output by the plural printers, at an outlet. Thus, it is easy for the user to pick up the plural prints on each of which image information is printed at once. The eject means also can sort the plural resultant prints in order of selection by the unit image selecting means.

The apparatus (101) according to the second aspect, wherein the plural printers (123-1 to 123-8) are sublimation thermal printers.

The apparatus (101) according to the second aspect, wherein each of the printers (123-1 to 123-8) has property storage means (140) for storing information (180) relating to thermal print head property, and the printing apparatus (101) comprises:

property read means (130) for reading the information (180) relating to the thermal print head property stored in the property storage means (140) of each printer; and power supply means (181) for controlling power to be supplied to the plural printers (123-1 to 123-8) in accordance with the information (180) relating to the thermal print head property of each printer read by the property read means (130).

The power supply in accordance with properties of the thermal print head substantially equalizes quality of images printed by the printers, because the properties of the thermal print heads are not equivalent even if they are the same model.

To accomplish the above objects, a printing apparatus according to a third aspect of the present invention is a printing apparatus (1, 101) comprises:

an image information reader (3, 104) which reads image information;

an advertisement information storage unit (8, 131) which stores advertisement information;

a processor (7, 130), being connected to the image information reader (3, 104) and the advertisement information storage unit (8, 131), which operates in accordance with a program; and printers (14, 123) which print images on a sheet (18, 153) based on the image data supplied from the processor (7, 130), wherein the processor (7, 130) reads the advertisement information from the advertisement information storage unit (8, 131), synthesizes the read advertisement information on the image information read by the image information reader (3, 104), and supplies the synthesized information to the printers (14, 123) as image data.

The apparatus (1, 101) according to the third aspect further comprises payment option selector (2, 102, 103) which allows a user to select pay printing or free printing, and the processor (7, 130) discriminates which of pay printing and free printing is selected by the payment option selector (2, 102, 103), and synthesizes the read advertisement information with the image information read by the image information reader (3, 104) in a case where the free printing is selected.

To accomplish the above objects, a printing apparatus according to a fourth aspect of the present invention is a printing apparatus (101) comprises:

a processor (130) which operates in accordance with a program; and a plurality of printers (123-1 to 123-8) being connected to the processor (130), each of which comprises an image former (140) for generating image data to be printed based on print information representing print guidance, and a printing unit (143) for printing the generated image data on a sheet (153), wherein the processor (130)

receives externally supplied print information, and distributes received print information to any of the plural printers (123-1 to 123-8) in accordance with a predetermined standard.

The apparatus (101) according to the fourth aspect, wherein the processor (130) detects status in each of the printers (123-1 to 123-8), and distributes the print information to any of the printers (123-1 to 123-8) in accordance with the detected inside status.

The apparatus (101) according to the fourth aspect, wherein the plural printers (123-1 to 123-8) are grouped into a plurality of groups each having at least one of the printers, and the processor (130) distributes the print information to any of the printers (123-1 to 123-8) group by group.

To accomplish the above objects, a method according to a fifth aspect of the present invention is a method of printing image information on a sheet (18, 153) comprises the steps of:

reading image information;

reading previously stored advertisement information; and printing the read image information on the sheet (18, 153) together with the read advertisement information.

To accomplish the above objects, a method according to a sixth aspect of the present invention is a method of printing images corresponding to input print information on a sheet (153) with using any of plural printers (123-1 to 123-8), comprising the steps of:

distributing the input print information to any of the plural printers (123-1 to 123-8) in accordance with a predetermined standard;

generating image data to be printed, in the printer to which the print information is distributed; and printing the generated image data on the sheet (153) with using a printing mechanism (143) in the printer which generates the image data.

BEST MODE FOR CARRYING OUT THE INVENTION

FIRST EMBODIMENT

Figure 1:
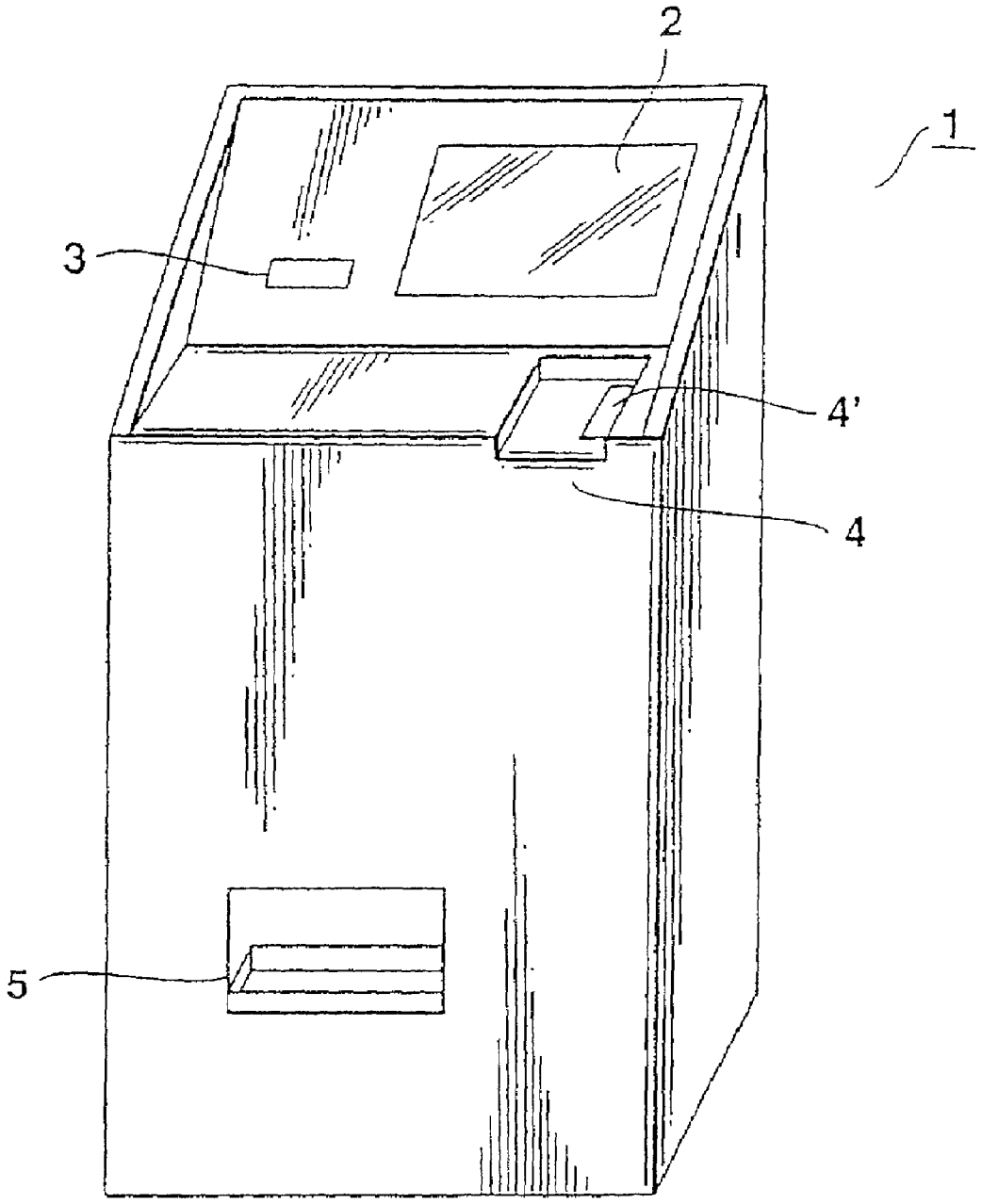
FIG. 1 is a diagram showing exterior structure of a print vending machine having ad affix function according to a first embodiment of the present invention.

FIG. 1 is a diagram showing a print vending machine 1 according to this embodiment. The print vending machine 1 is designed to be placed, for example, on the streets or in buildings such as office buildings. As shown in FIG. 1, the print vending machine 1 comprises a display/operation panel 2, a media slot 3, a payment/return slot 4, and a sheet outlet 5.

The display/operation panel 2 comprises a display such as a liquid crystal display, and a touch panel (tablet) formed on the display. The display displays keys, buttons, icons, and the like, and a user touches them. The display/operation panel 2 senses where the user touches, and input a signal representing the touch position.

The display/operation panel 2 also displays thumbnail images, and mode select icons which provide the user with options free service or pay service. The user selects the service mode and inputs print quantity through the display/operation panel 2.

The media slot 3 accepts a recording medium (such as a flash memory card, a CompactFlash (TM) card, a PCMCIA card, a floppy disk (FD), a magneto-optical disk (MO), and a compact disc ROM (CD-ROM)) for storing digital data representing images.

The recording medium stores digital data representing a plurality of images captured by a digital camera or the like. The image capturer may be an image scanner, and the like.

Various readers are installed in the media slot 3 so that the print vending machine 1 accepts various kinds of the recording medium.

The payment/return slot 4 is prepared for the payment service mode. The payment/return slot 4 comprises a coin bucket 4'. The user inserts bills into the payment/return slot 4 and coins in the coin bucket 4' for the payment service. The print vending machine 1 gives the user change through the payment/return slot 4 and/or the coin bucket 4'.

The print outlet 5 is a box-like outlet portion for serving sheets on which ordered images are printed. The print vending machine 1 provides the user with the image sheets which are enveloped. The print vending machine 1 serves extra goods such as a plain mini album or the like.

Figure 2:
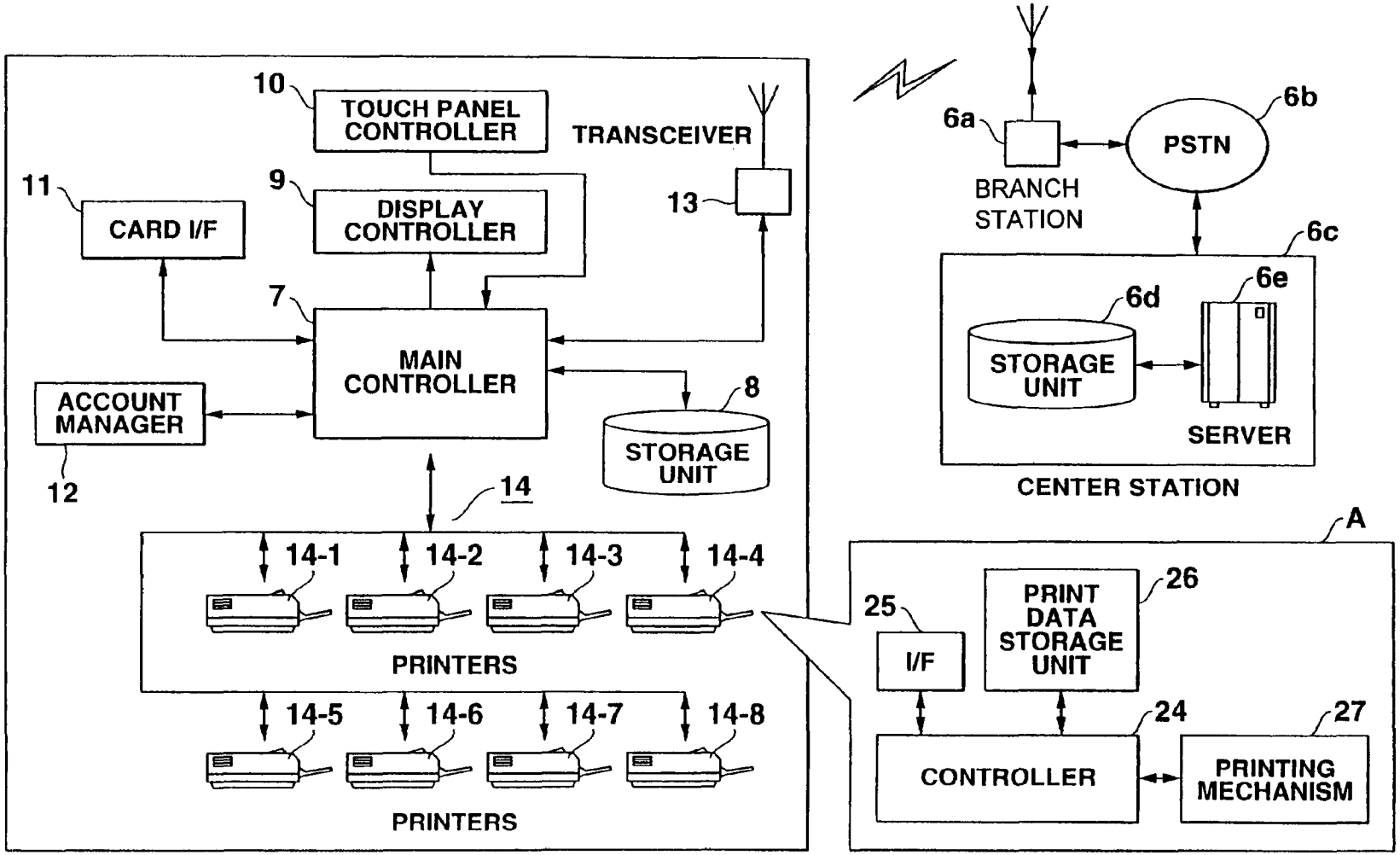
FIG. 2 is a diagram showing the internal structure of the print vending machine according to the first embodiment of the present invention.

FIG. 2 is a diagram showing the system structure of the print vending machine 1.

As shown in FIG. 2, the print vending machine 1 comprises a main controller 7, and peripherals. The peripherals are a storage unit 8, a display controller 9, a touch panel controller 10, a card interface (hereinafter, referred to as card I/F) 11, an account manager 12, a transceiver 13, and a printing unit 14, which are connected to the main controller 7.

The main controller 7 comprises a CPU (Central Processing Unit) which runs in accordance with a program stored in the storage unit 8, so as to control operations of the print vending machine 1.

The storage unit 8 stores the program which determines the operations of the print vending machine 1, and advertisement information (described later) supplied from a center station (described later). The advertisement information is updated constantly at predetermined intervals.

The display controller 9 controls the display/operation panel 3 (display and touch panel; shown in FIG. 1) to display thereon output information supplied from the main controller 7.

The touch panel controller 10 provides the main controller 7 with a touch position signal supplied from the touch panel.

The card I/F 11 reads digital image data from the recording media such as the flash memory card, the PC card, and the floppy disk (FD) being inserted in the media slot 3 shown in FIG. 1, and supplies the read data to the main controller 7.

The account manager 12 counts money inserted in the payment/return slot 4, and determines whether it is suitable for the input print quantity or not. The account manager 12 performs appropriate operations in accordance with the free service or the payment service which is instructed by the main controller 7. The account manager also manages the charge.

The transceiver 13 communicates with a branch station 6a via a PHS (Personal Handyphone System) network (mobile cellular phone network also available). The branch station 6a is connected to a center station 6c via a PSTN (Public Switched Telephone Network) 6b and the like. The center station 6c comprises a storage unit 6d and a server 6e. A service provider contracts with various companies and enterprises, and gathers their advertisement information. The storage unit 6d stores the gathered advertisement information. The server 6e provides users with the advertisement information stored in the storage unit 6d via the PSTN 6b, and receives printer maintenance information from the print vending machine 1 via the PSTN 6b. The printer maintenance information represents orders for unit exchange, large size ink ribbon exchange, print sheet exchange, or the like (details will be described later). The printing unit 14 requests the main controller 7 to prepare the printer maintenance information and send it through the transceiver 13. The printer maintenance information is relayed by the PHS network, the branch station 6a, and the PSTN network 6b, and thus reaches the center station 6c.

The printing unit 14 comprises 8 printers 14-1 to 14-8 each having the same structure.

Figure 3:
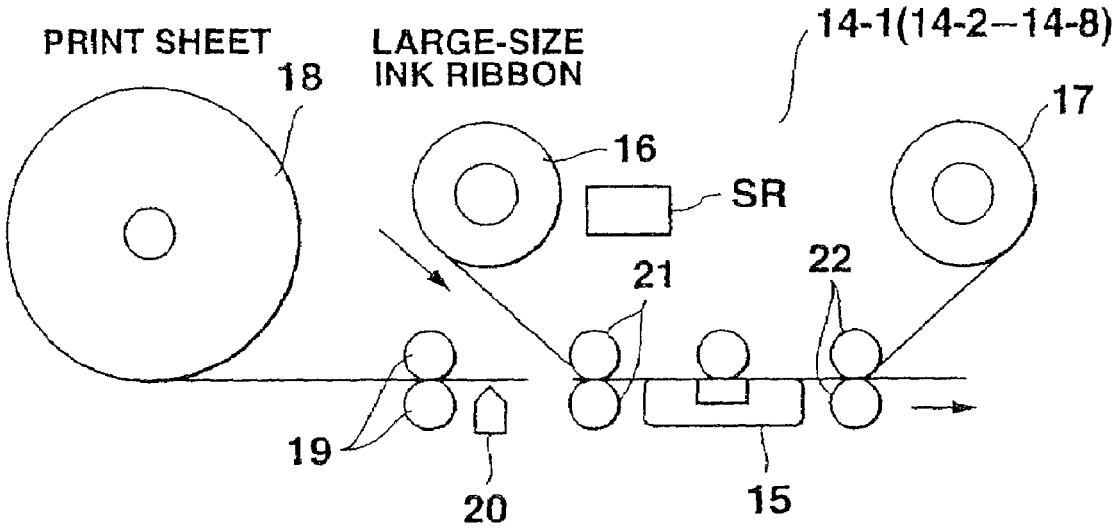
FIG. 3 is a diagram for explaining the structure of a printer.

FIG. 3 is a diagram showing the structure of the printers 14-1 to 14-8. Each of the printers 14-1 to 14-8 comprises a thermal print head 15, a large-size ink ribbon 16, a rewinding roller 17, a roll of printing sheet 18, and a plurality of forwarding rollers. The print sheet 18 is forwarded by a pair of forwarding rollers 19 toward the rollers 21, and a cutter 20 cuts the print sheet 18 at appropriate position. The roll of the print sheet 18 may have, for example, 102 mm width (maximum), and enough length for providing 500 cut sheets.

The large-size ink ribbon 16 comprises yellow (Y) ink bands, magenta (M) ink bands, cyan (C) ink bands, and top coat bands each having the length corresponding to one image size, which are disposed constantly until being enough for 500 cuts of sheets.

Pairs of the forwarding roller 21 and 22 press the print sheet 18 and the ink ribbon 16 so that they contact each other, and forward them toward the thermal print head 15. Used sections of the ink ribbon after printing by the thermal print head 15 will be rewound by the rewinding roller 17.

The thermal print head 15 comprises heating elements for 1,344 dots (approx. 106 mm) in the main scanning direction with resolution of 322 dpi (dots/inch). The thermal print head 15 receives print data (image data) for each image from the main controller 7.

In FIG. 2, a reference alphabet A denotes an inner system of each of the printers 14-1 to 14-8 which comprises a print controller 24, an interface (hereinafter, referred to as I/F) 25, print data storage unit 26, and a printing mechanism 27. The print controller 24 receives the print data for each image from the main controller 7 via the I/F 25, and stores the received print data in the print data storage unit 28. Detail of the printing mechanism 27 is shown in FIG. 3, that is, it comprises the thermal print head 15, the large-size ink ribbon 16, the print sheet 18, and the like.

The print controller 24 reads the print data stored in the print data storage unit 26 and output the read data to the thermal print head 15. The thermal print head 15 turns on the heating elements in accordance with the supplied print data to sublimates small dots of dye of the yellow (Y) ink band, magenta (M) ink band, and cyan (C) ink band toward the print sheet, thus, images are formed thereon.

Each of the printers 14-1 to 14-8 is a unit printer which is detachable to the print vending machine 1, and is exchangeable individually when its expendable supplies should be exchanged.

Each attachment for the ink ribbon comprises a remaining ink sensor SR. The ink ribbon has a mark which indicates that, for example, capacity of the inks is 50 sheets of images, and the sensor SR detects the mark. In response to the detection, the sensor SR sends a detection signal to the main controller 7. The main controller 7 receives the detection signal, and transmits alarm code information representing serial No. of the print vending machine 1 concerned and which supply is exhausted, to the center station 6c via the branch station 6a.

Each unit printer also has a failure sensor which senses various failures.

The unit printers comprise a plurality of reserve print units (not shown) in addition to the basic mechanisms 14-1 to 14-8. A distribution controller B4 (described later) automatically activates the reserve print unit when main print unit fails to print. This structure helps to perform nonstop print operation even if some of the unit printers have troubles.

Operations of thus structured print vending machine 1 will now be described with reference to flowcharts shown in FIGS. 4 and 5. Note that FIGS. 6 to 8 will be referred to as needed for comprehensively explaining the process along the process flow shown in FIG. 4.

A user captures images by, for example, a digital camera, and stores them on an arbitrary recording medium, for example, a flash memory card. Or, he/she operates a image reader to capture an arbitrary image, and stores it on, for example, the flash memory card.

When the user requires to print the captured image with high quality, he/she goes to the place where the print vending machine 1 is settled in, and inserts the flash memory card into the media slot 3 on the print vending machine 1.

Figure 4:
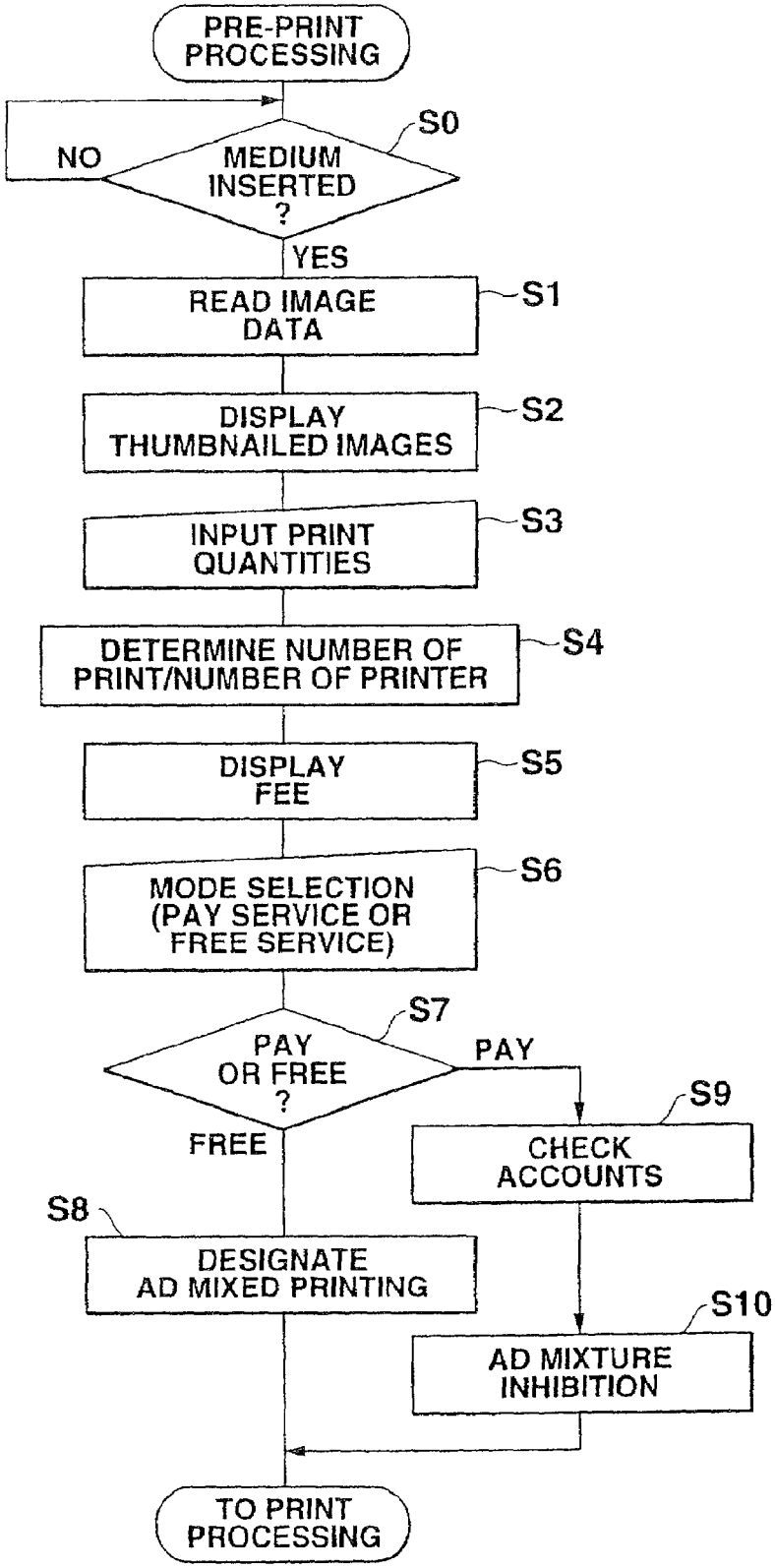
FIG. 4 is a flowchart for explaining process flow according to the first embodiment.
Figure 5:
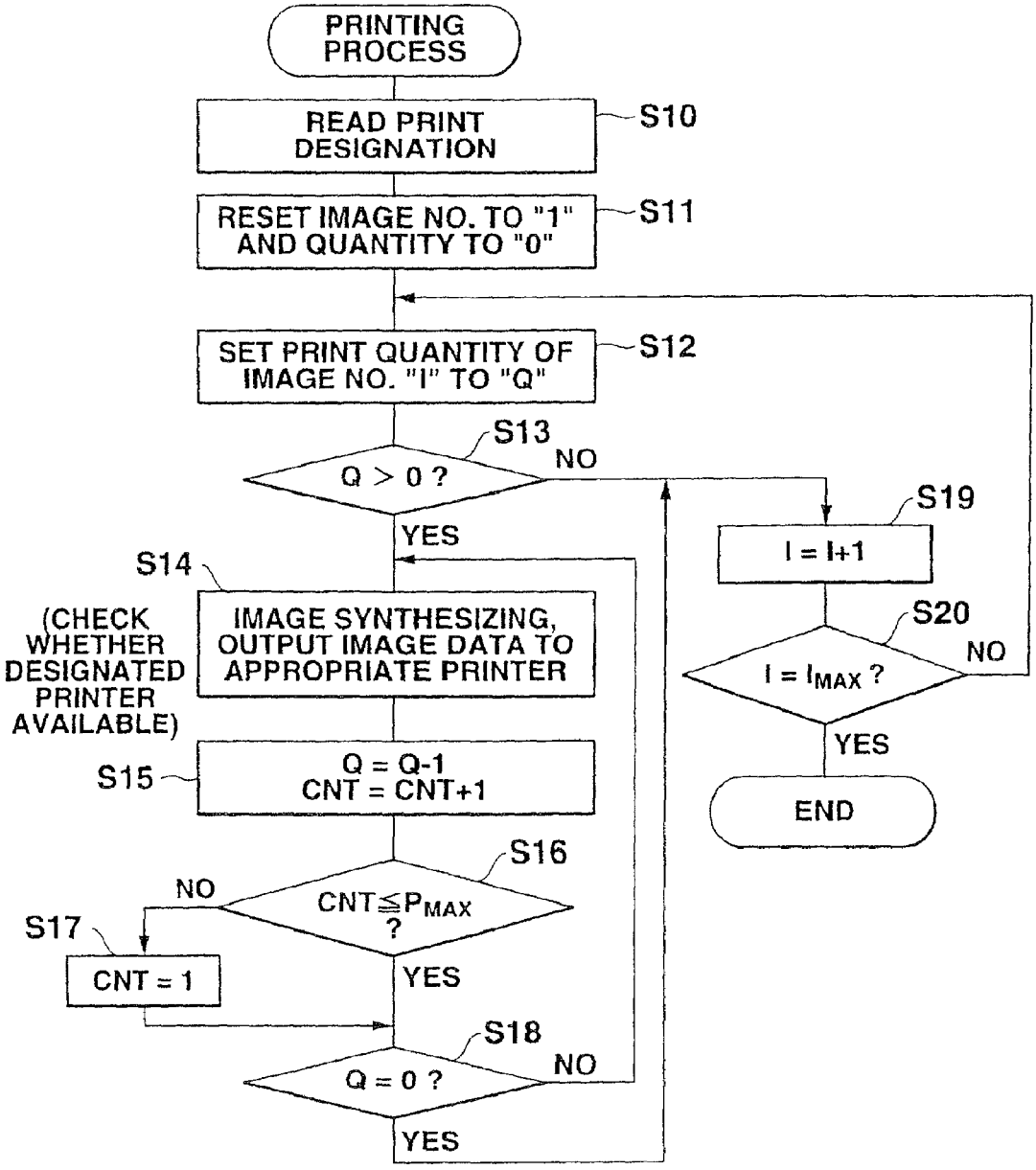
FIG. 5 is a flowchart for explaining process flow according to the first embodiment.

The main controller 7 cyclically executes processing (main flow) shown in FIG. 4 in accordance with, for example, timer interruption. The main controller 7 waits for media insertion, that is, always detecting whether a recording medium is inserted in the media slot 3 (step S0).

In response to the insertion of, for example, the flash memory card into the media slot 3, the card I/F 11 detects it and informs the main controller 7 of the insertion, thus, the main controller detects media insertion at step S0 (YES).

Figure 6:
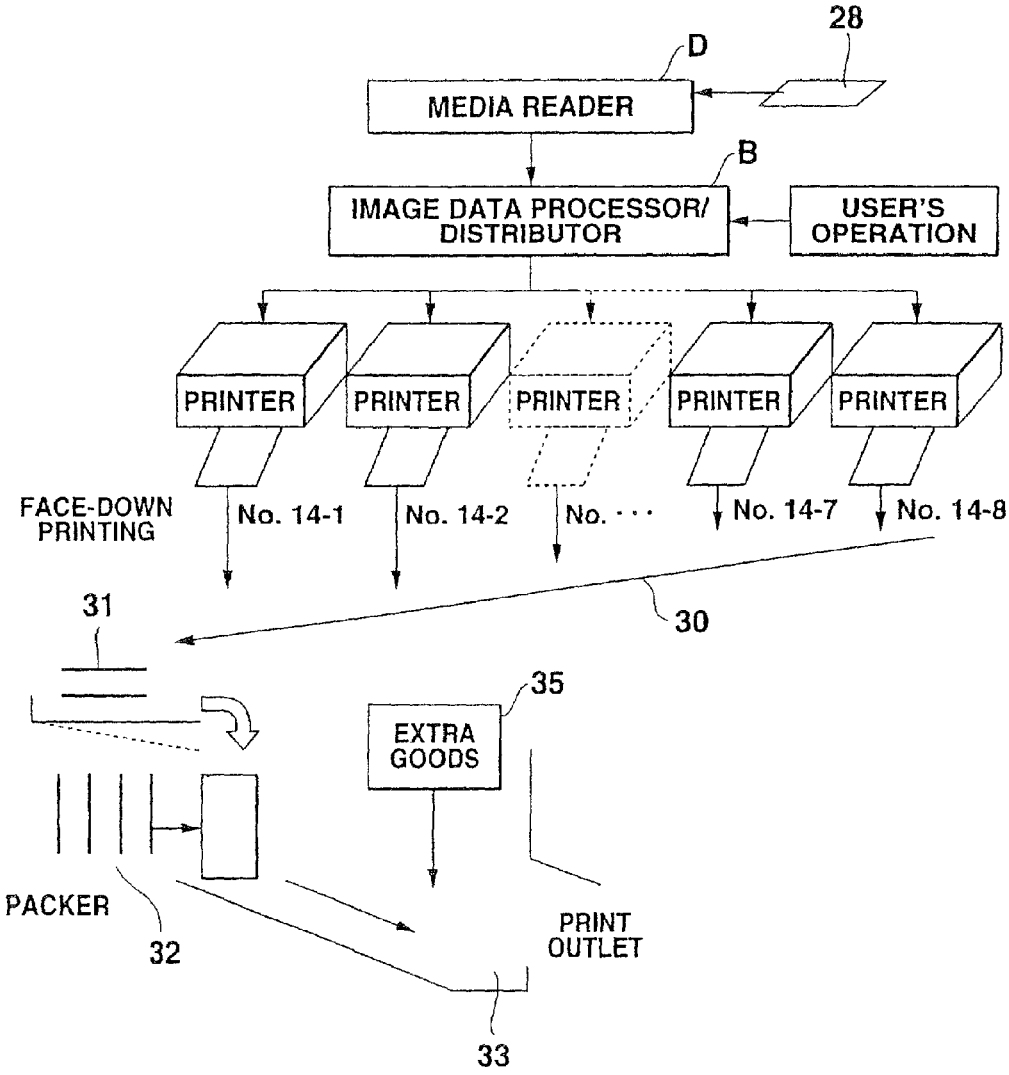
FIG. 6 is a diagram schematically showing the processing according to the first embodiment.

After the media insertion is detected, the main controller 7 reads the image data from the flash memory card 28 via the card I/F 11 indicated by a reference alphabet D in FIG. 6, and develops the read image data in a buffer (step S1).

This process will now be described with reference to FIG. 7. In this case, the flash memory card 28 is used as the recording medium, and frame indexes are affixed to image data read from the flash memory card 28. The storage unit 8 shown in FIG. 3 comprises a buffer B1, a frame memory B2, and an ad image memory B3. The buffer B1 has an image data capacity for, for example, 24 images. The controller 7 writes the image data read from the flash memory card 20 on the buffer B1. During this writing operation, the controller 7 affix the frame indexes among data sets each representing one image.

After developing the image data in the buffer, the controller 7 outputs the data sets to the display/operation panel 2 via the display controller 9 set by set based on the margin indexes so that thumbnailed images are displayed on the display/operation panel 2 (step S2).

The user refers to the displayed thumbnailed images, and inputs desired print quantity for each image (step S3). The touch panel senses the touch positions and supply the operation signals representing the touch positions to the main controller 7. The storage unit 8 is controlled by the main controller 7 to store the input print quantities (represented by a parameter Q) in association with image No. in accordance with the operation signals. The main controller 7 further stores total print quantity (represented by a parameter N) on the storage unit 8, and determines the number of the printers (represented by a parameter $P_{MAX}$) to print the images (step S4).

Figures 8, 9:
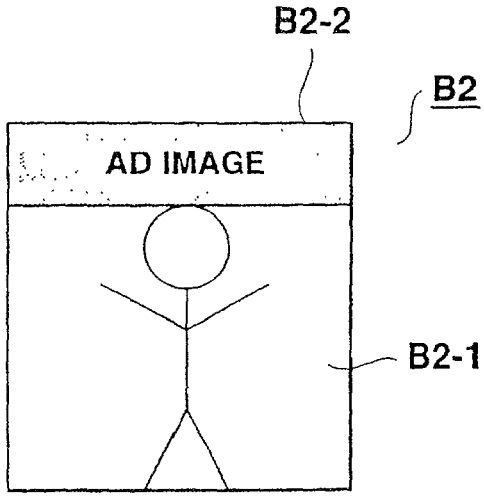
FIG. 8 is a diagram data configuration stored in a storage unit, representing target images and their print quantities.
FIG. 9 is a diagram exemplifying image data developed in a frame memory.

FIG. 8 exemplifies data on the storage unit 8 stored by the above processing.

In this example, the image data read from the flash memory card 28 includes 10 frames of images. "1 copy" is designated to No. 1 image, "0 copy" is designated to No. 2 image, . . . , and "3 copies" is designated to No. 10 image.

The total print quantity N indicates "13"'. In this case, the print vending machine is equipped with 8 printers, therefore, $P_{MAX}$ indicates "8". Those data are stored in the storage unit 8. An item "counter (CNT)" is a counter which is initially set to "1" before shipping, and it increments by +1 at every printing. When the count value exceeds $P_{MAX}$, the counter value is reset to "1". The current counter value represents any one of the printers 14-1 to 14-8.

Now back to FIG. 4, the main controller 7 calculates total fee corresponding to the total print quantity N, and controls the display/operation panel 2 to display the total fee (step S5). The fee is calculated by, for example, quantity×price/sheet+tax.

The main controller 7 controls the display/operation panel 2 to display option icons together with the fee. The option icons are icons to be touched by the user for selecting the service mode, pay service or free service (advertisements will be affixed to the resultant images in case of free service mode).

The user refers to the fee and selects one by touching the pay service icon or the free service icon (step S6). The touch panel's operation signal is supplied to the main controller 7, thus, the main controller 7 determines which mode is selected (step S7).

In a case where the free service mode is selected ("FREE" at step S7), the flow forwards to step S8 where the main controller 7 sets a flag which designates ad affixed printing for printing the image on which an ad image is applied.

In case of the pay service mode ("PAY" at step S7), the flow goes to step S9 for payment accept processing.

In this process, the main controller 7 controls the display/operation panel 2 to display a message, for example, "INSERT BILLS/COINS" or the like. When the user inserts bills/coins into the payment/return slot 4 in accordance with the message, the account manager 12 counts the inserted money to determine whether it is enough for the fee. If the inserted money exceeds the fee, the account manager gives the user the change. In case of shortage, the account manager 12 informs the main controller 7 of payment shortage, and the main controller 7, for example, controls the display/operation panel 2 to display a message for requesting additional money or print quantity correction. After the account manager 12 confirms suitable account for the fee, the main controller 7 sets a flag for ad affix inhibition (step S10).

In step 8 or 10, each of the printers 14-1 to 14-8 performs print/distribution processing (represented by a reference alphabet B in FIG. 6) after the flag setting. Two different sets of printing processing are prepared, and they depend on which service mode is selected. Since the printing processing of the free service mode is a characteristic feature of the present invention, it will now be described with reference to a flowchart shown in FIG. 5 and FIGS. 6 to 9 as needed.

First, the main controller 7 resets image No. to "1" (step S11), and sets print quantity Q for image No. 1 (step S12).

Then, the main controller 7 discriminates whether Q>0 or not (step S13). If Q>0, (step S13 is "YES"), the main controller 7 synthesizes an ad image on the image data corresponding to image No. 1, and informs the distribution controller B4 (see FIG. 7) that synthesizing is completed (step S14).

Figure 7:
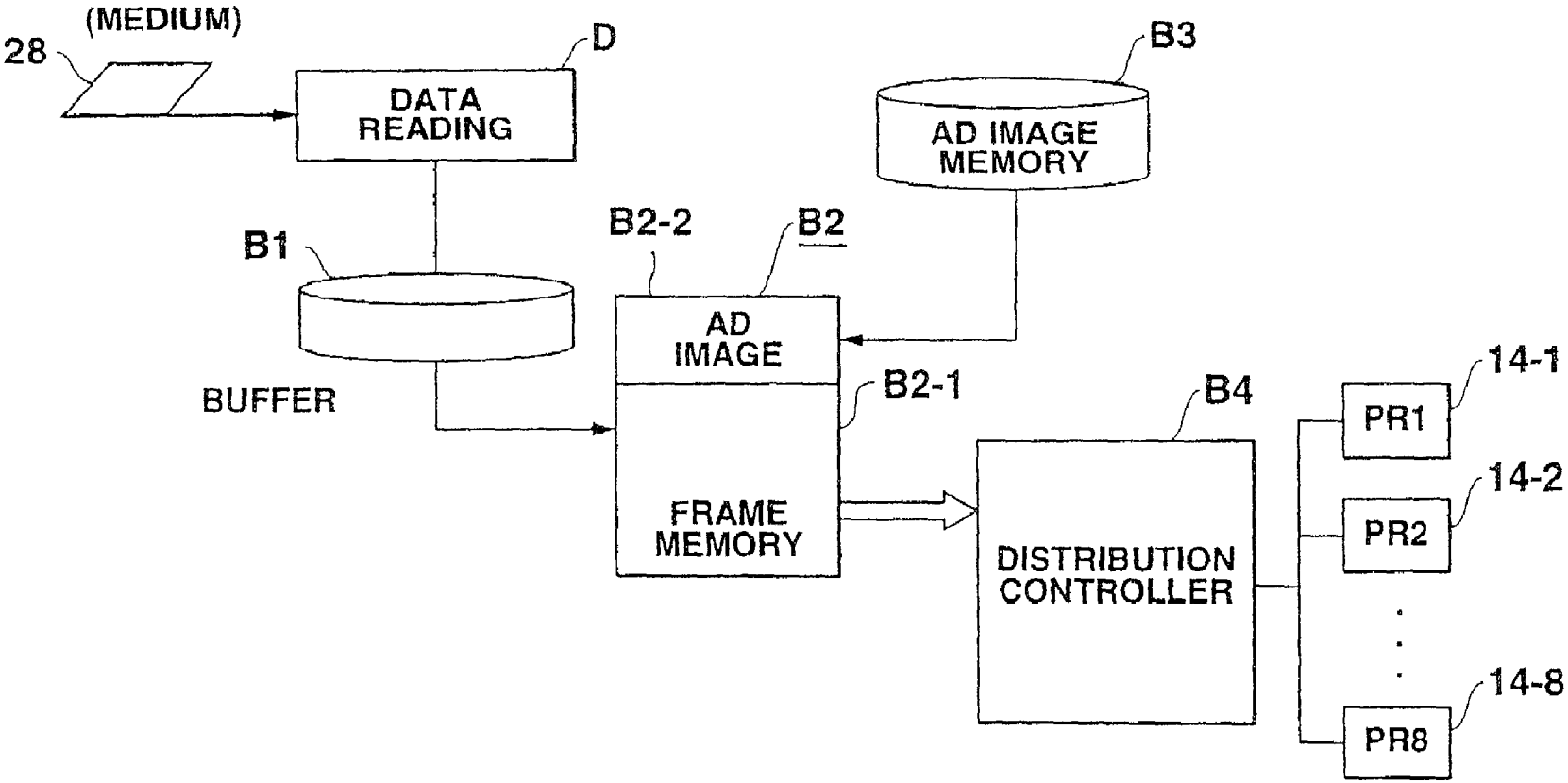
FIG. 7 is a schematic diagram showing image data processing and image distribution processing in detail.

In a case where, for example, the buffer B1 shown in FIG. 7 holds image data for 10 frames of images, the main controller 7 reads the first image data set and develops it in a read image area of the frame memory B2. The main controller 7 further reads the ad image data set from the ad image memory B3, and develops it in an ad image area of the frame memory B2. Thus, the developed image and ad image are synthesized in the frame memory B2 which stores data for one image to be printed.

The distribution controller B4 receives the information that images are synthesized from the main controller 7, and reads the print data from the frame memory B2. The read print data set is output to an appropriate printer indicated by the counter (CNT). Each of the printers 14-1 to 14-8 once stores supplied print data in the print data storage unit 26, and outputs the stored data to the printing mechanism 27 under control of the print controller 24, then the thermal print head 15 performs thermal printing in accordance with the print data to print the image on the print sheet 18.

FIG. 9 exemplifies print data developed in the frame memory B2. As shown in FIG. 9, the image data set representing the first image read from the buffer B 1 is developed in the read image area B2-1, and the ad image data set representing the ad image read from the ad image memory B3 is developed in the ad image area B2-2. The ad image may be a text-only image, a photograph of celebrities or professional athletes provided by the advertiser, illustrated characters, or the like.

The main controller 7 then reduces the print quantity Q (−1), and increments the counter (CNT) (step S15). That is, the print quantity Q becomes "0", and the counter (CNT) indicates "2".

The main controller 7 discriminates whether the counter value reaches $P_{MAX}$ or not (step S16). If the print vending machine 1 employs 8 printers 14-1 to 14-8 as shown in FIG. 2, $P_{MAX}$ indicates "8". In case of 8-printer structure, if the counter (CNT) indicates "9", determination at step S16 is "NO", and the main controller 7 resets the counter (CNT) to "1" (step S17), then the flow forwards to step S18. If the counter value is equal to or smaller than "8", determination at step S16 is "YES", and the flow directly forwards to step S118.

In step S18, the main controller 7 determines whether the print quantity Q indicates "0" or not. If the print quantity Q is not "0", the flow returns step S14.

On the contrary, if it is determined at step S18 that the print quantity is "0" ("YES" at step S18), the main controller 7 increments the image No. by +1 (step S19), and determines whether the resultant image No. reaches total image quantity $I_{MAX}$ or not (step S20). If the image No. does not reach $I_{MAX}$, the flow returns to step S12 to set print quantity Q of the next image.

If image No. reaches $I_{MAX}$, the determination at step S20 is "YES" and the main controller 7 terminates the process. During the above process, image data sets are sequentially supplied to the printers 14-1 to 14-8 frame by frame, however supply timings are offset. Therefore, timings of printing performed by the printers 14-1 to 14-8 are also offset.

The above described image printing/distribution processing will now be explained comprehensively in accordance with an example. Prior to a first step of this example, images Nos. 1 to 10 have been read at step S1 in FIG. 4; print quantities Q of 1, 1, 1, 1, 1, 2, 1, 2, 1, and 3 have been designated to the images Nos. 1 to 10 respectively, therefore, "14" has been applied to total print quantity N; and all printers 14-1 to 14-8 are available, therefore, "8" has been applied to $P_{MAX}$.

As the first step, the main controller 7 sets "1" which is print quantity for image No. 1 to the parameter Q (step S12). The image No. 1 is synthesized with the ad image, and is printed by the first printer 14-1 (step S14). Since reduction of the parameter Q by 1 (step S15) is 0 ("YES" at step S15), the main controller 7 proceeds to processing for the next image No. 2.

The main controller 7 sets "1" which is print quantity for image No. 2 to the parameter Q (step S12). The image No. 2 is synthesized with the ad image, and is printed by the next printer 14-2 (step S14). Since reduction of the parameter Q by 1 (step S15) is 0 ("YES" at step S15), the main controller 7 proceeds to processing for the next image No. 3.

The main controller 7 sets "1" which is print quantity for image No. 3 to the parameter Q (step S12). The image No. 3 is synthesized with the ad image, and is printed by the next printer 14-3 (step S14). Since reduction of the parameter Q by 1 (step S15) is 0 ("YES" at step S15), the main controller 7 proceeds to processing for the next image No. 4.

The main controller 7 sets "1" which is print quantity for image No. 4 to the parameter Q (step S12). The image No. 4 is synthesized with the ad image, and is printed by the next printer 14-4 (step S14). Since reduction of the parameter Q by 1 (step S15) is 0 ("YES" at step S15), the main controller 7 proceeds to processing for the next image No. 5.

The main controller 7 sets "1" which is print quantity for image No. 5 to the parameter Q (step S12). The image No. 5 is synthesized with the ad image, and is printed by the next printer 14-5 (step S14). Since reduction of the parameter Q by 1 (step S15) is 0 ("YES" at step S15), the main controller 7 proceeds to processing for the next image No. 6.

The main controller 7 sets "2" which is print quantity for image No. 6 to the parameter Q (step S12). The image No. 6 is synthesized with the ad image, and is printed by the next printer 14-6 (step S14). Since reduction of the parameter Q by 1 (step S15) is 1 ("YES" at step S15), the No. 6 image is further synthesized with the ad image and printed by the next printer 14-7 (step S14). Then, since reduction of the parameter Q by 1 (step S15) is 1 ("YES" at step S15), the main controller 7 proceeds to processing for the next image No. 7.

The main controller 7 sets "1" which is print quantity for image No. 7 to the parameter Q (step S12). The image No. 7 is synthesized with the ad image, and is printed by the next printer 14-8 (step S14). Since reduction of the parameter Q by (step S15) is 0 ("YES" at step S15), the main controller 7 proceeds to processing for the next image No. 8. Because the printer 14-8 is the last printer, the first printer 14-1 is designated for the next printing.

The main controller 7 sets "2" which is print quantity for image No. 8 to the parameter Q (step S12). The image No. 8 is synthesized with the ad image, and is printed by the printer 14-1 (step S14). Since reduction of the parameter Q by 1 (step S15) is 1 ("YES" at step S15), the No. 8 image is further synthesized with the ad image and printed by the next printer 14-2 (step S14). Then, since reduction of the parameter Q by 1 (step S15) is 0 ("YES" at step S15), the main controller 7 proceeds to processing for the next image No. 9.

The main controller 7 sets "1" which is print quantity for image No. 9 to the parameter Q (step S12). The image No. 9 is synthesized with the ad image, and is printed by the next printer 14-3 (step S14). Since reduction of the parameter Q by 1 (step S15) is 0 ("YES" at step S15), the main controller 7 proceeds to processing for the next image No. 10.

The main controller 7 sets "3" which is print quantity for image No. 10 to the parameter Q (step S12). The image No. 10 is synthesized with the ad image, and is printed by the printer 14-4 (step S14). Since reduction of the parameter Q by 1 (step S15) is 2 ("YES" at step S15), the No. 10 image is further synthesized with the ad image and printed by the next printer 14-5 (step S14). Since reduction of the parameter Q by 1 (step S15) is still 1 ("YES" at step S15), the No. 10 image is further synthesized with the ad image and printed by the next printer 14-6 (step S14). Then, reduction of the parameter Q by 1 (step S15) becomes 0 ("YES" at step S15).

At that time, a parameter I which represents the image No. becomes "11" (step S19) which exceeds the maximum quantity of "10" ("YES" at step S20). This indicates that printing of all designated images is completed.

Figure 10:
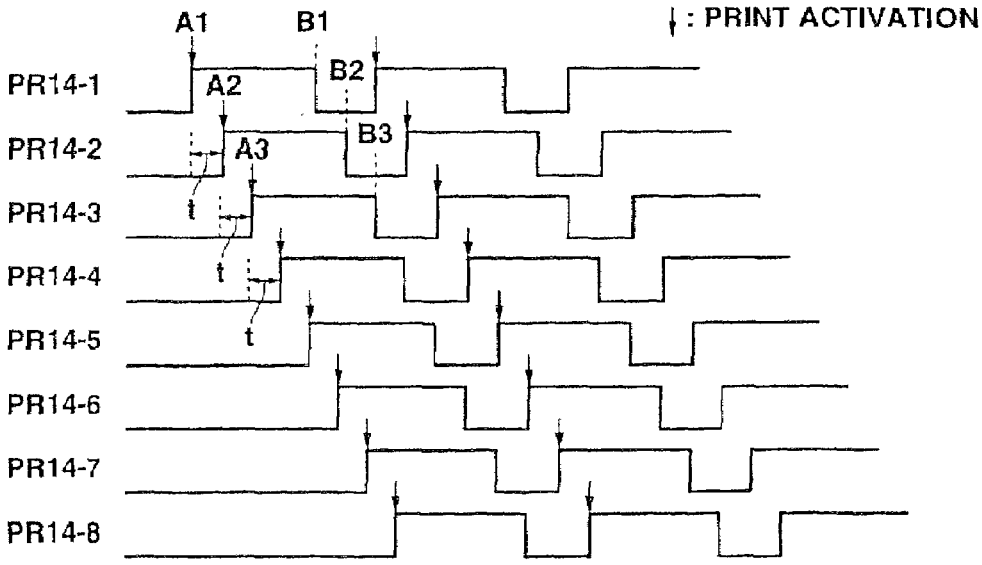
FIG. 10 is a timing chart of print processing by the printers.

FIG. 10 is a timing chart showing operational relationship among the printers 14-1 to 14-8. Each of the printers 14-1 to 14-8 works during the timing chart shows high level. For example, the printer 14-1 starts printing at A1, and performs the printing until B 1. The printer 14-2 starts printing at A2 which is behind A1 with "t", and performs the printing until B2. The printer 14-3 starts printing at A3 which is further behind A2 with "t", and performs the printing until B3.

In the same manner, the printers 14-4, 14-5, 14-6, 14-7, and 14-8 are driven sequentially with shifted timings (shift amount is "t"). Moreover, each printer performs printing sequentially. For example, the printer 14-1 finishes first printing and starts next printing while the printer 14-4 performs its printing.

The above structure wherein 8 printers 14-1 to 14-8 are driven sequentially, helps to perform quick printing even if the print quantity is large. For example, if each of the printers 14-1 to 14-8 can print one image within 30 seconds, 24 images can be printed within 1:30.

Thus, the synthesized image data sets are sequentially printed and output by the printers 14-1 to 14-8. The printed sheets are stacked in a tray 31 via a slider 30 as shown in FIG. 6. In a case where the printers 14-1 to 14-8 are face-down style printers which serves the resultant sheets whose printed surfaces face downward, the printed sheets are stacked in the tray 31 with their printed surfaces face the tray's 31 bottom.

A packer 32 envelops the sheets (for example, 24 sheets) on the tray 31, and drops it into the print outlet 33 (5). Instead of enveloping, the packer 32 may insert separator sheets among the printed sheets. Or, the packer 32 bands the set of printed sheets together.

Thus, the user (buyer) obtains packed print images from the print outlet 33 (5). According to this example, the user of the print vending machine 1 just inserts a recording medium such as a flash memory card storing digital images in the media slot 3 and operates through the display/operation panel (display and touch panel) 2, and obtains the printed images from the print outlet 33 (5).

As described above, in case of the free service mode selected at step S6 (FIG. 4), the ad image is printed together with the image read from the recording medium. That is, the user is provided with the free service because the advertiser bears the charge. The advertiser may not bear full charge, so that the user is provided with discount service. In any case, the user's cost is reduced. The telecommunication between the vending machine and the center station 6c allows flexible update of the ad images. This structure is helpful for the advertiser to gain improved advertisement effect.

Moreover, since the print vending machine 1 which synthesizes the ad image is equipped with 8 printers for parallel processing, it just takes very short time to complete the printing. Since the printers 14-1 to 14-8 are sublimation thermal printers, served prints have high quality as well as film photo.

In FIG. 6, the print vending machine 1 comprises an extra goods server 35 above the print outlet 33 (5). The extra goods server 35 drops an extra products such as a plain mini album or the like into the print outlet 5. The extra goods is served to a user who spends money larger than a predetermined amount at using the print vending machine 1.

Figures 11A, 11B, 11C, 11D, 11E:
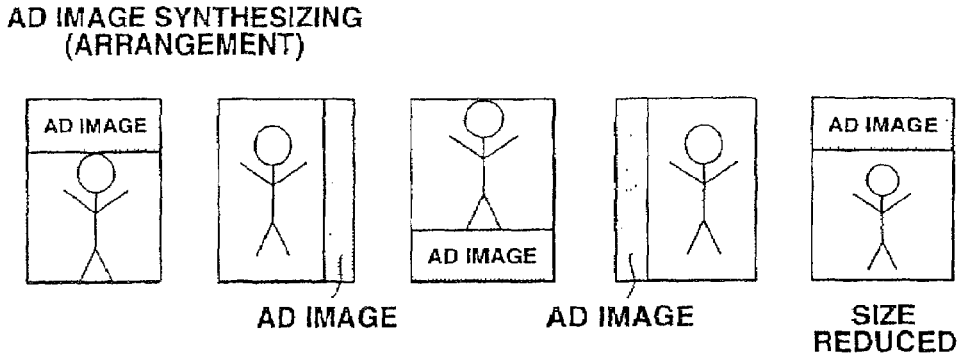
FIG. 11A is a diagram exemplifying arrangement of the ad image and the target image.
FIGS. 11B to 11E are diagrams showing other examples of the image arrangements.

In the above embodiment, the ad image is placed above the target image as shown in FIG. 9, however, ad image position is arbitrarily disposable. For example, the ad image may be placed at right side of the target image as shown in FIG. 11B, or placed at bottom of the target image as shown in FIG. 11C, or placed at left side of the target image as shown in FIG. 11D. Or, the ad image may be placed above the target image as shown in FIG. 9 (FIG. 11A) while the target image is reduced as shown in FIG. 11E.

The print/distribution processing in case of free service mode has been explained above. In case of the payment service mode on the contrary, the main controller 7 may perform the followings: writing the target data image on the read image area B2-1 in the frame memory B2 without writing the ad image on the ad image area B2-2; and outputting thus prepared image data sets to the distribution controller B4 which sequentially distributes the image data sets to the printers 14-1 to 14-8 for printing.

Figure 12:
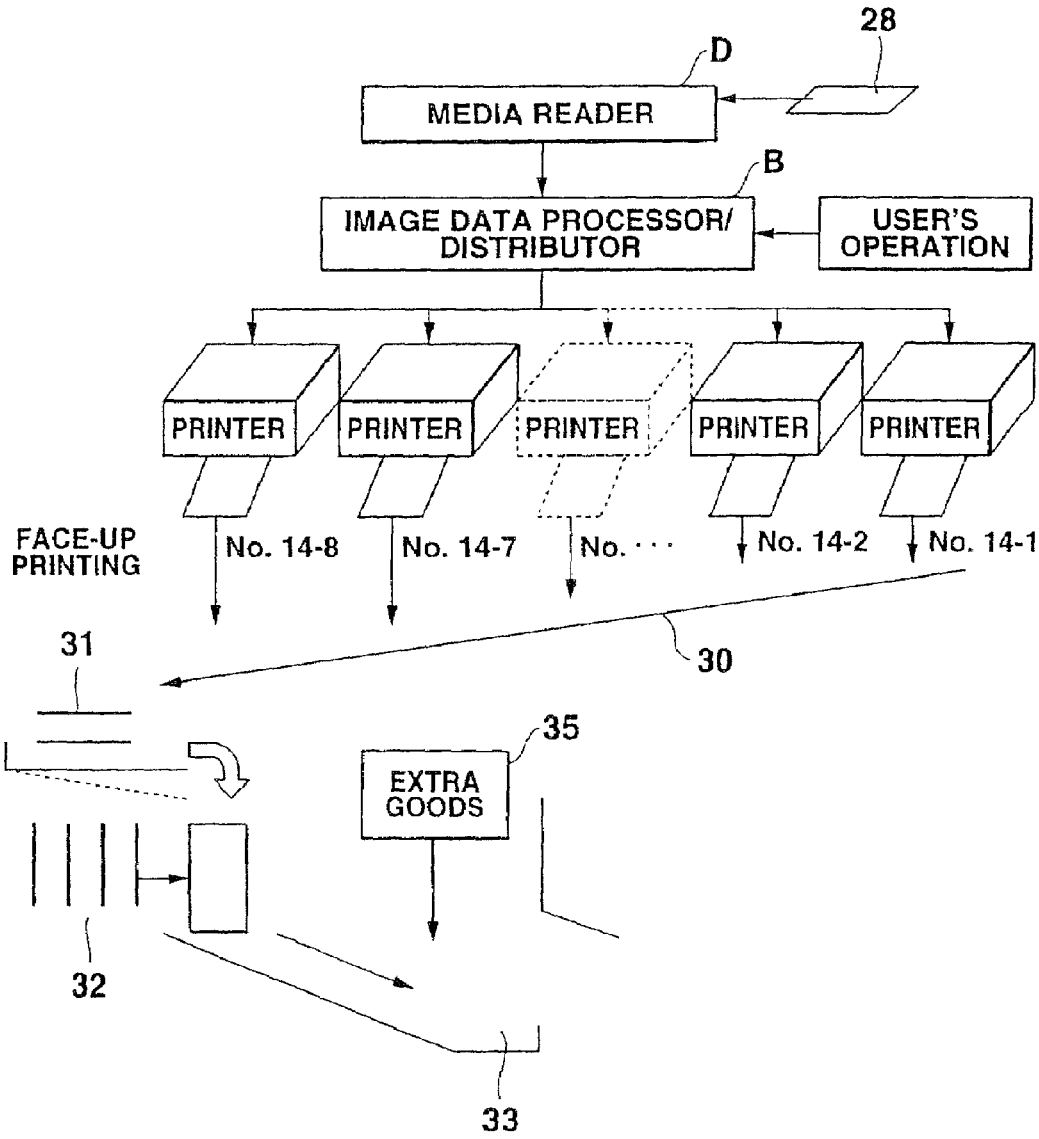
FIG. 12 is a schematic diagram exemplifying a modified embodiment.

In the above embodiment, the printers 14-1 to 14-8 are face-down style printers, however, the printer order may be reversed from that shown in FIG. 6 so as to be converted to face-up style (shown in FIG. 12). In this case, the printed sheets are stacked while their printed surfaces face upward. Although the face-up style, the packing by the packer 32 and the extra goods serving are executed as well as the above described case.

Figure 13:
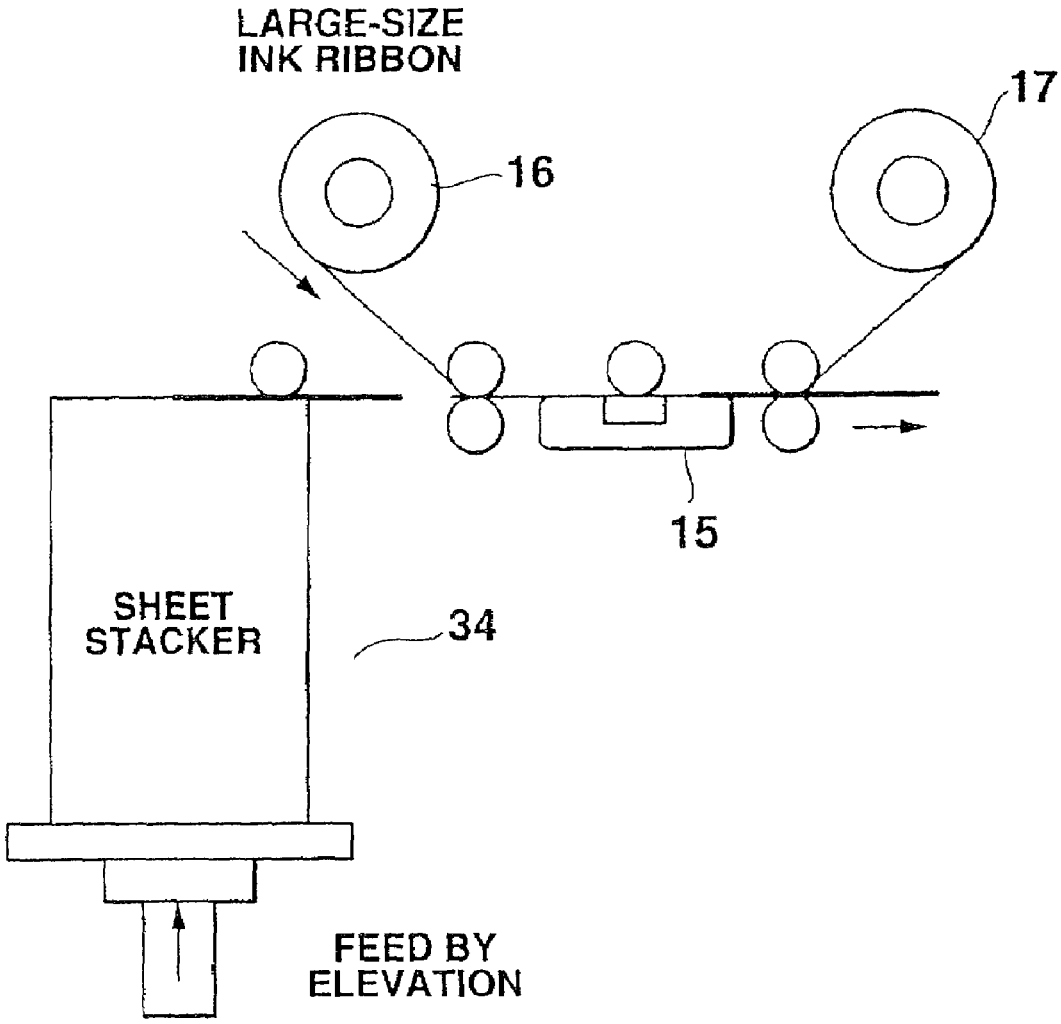
FIG. 13 is a diagram exemplifying a modified embodiment relating to sheet feeding.

Instead of rolled print sheet 18, pre-cut sheets structure as shown in FIG. 13 may be employed. In this case, cut sheets are stacked in a sheet stacker 34 which elevates to supply each sheets to the printing mechanism 27. A capacity of the sheet stacker 34 may be, for example, 500 sheets. The printing mechanism 27 including the thermal print head 15, the rewinding roller 17, or the like is the same as that shown in FIG. 3.

In the above embodiment, the printing process employs first-in first-out style data reading, that is, first read image data is printed first. However, the buffer B1 may stores all image data to be printed, and printing order may be reversed. In stead of using the recording medium, the automatic print vending machine 1 obtains image data directly from, for example, a digital still camera. In this case, the vending machine 1 may have an interface for direct connection with the digital camera via a cable.

A plurality of print outlets 33 may be applied to the print vending machine 1. Such the multiple outlet structure is suitable for dealing with multiple users at once, because it allows sequential output for the multiple users even if they do not take out the printed sheets from the outlet immediately. In this case, the outlet may be a sorter-like outlet box having plural slots.

Such the outlet box may be employ protection structure. For example, when a user inputs print designation, the print vending machine 1 provides the user with a card on which a bar code for identification, outlet box No., and assumed print complete time are printed, and the outlet box is locked until the user shows or insert the card into a bar code reader. Thus, only the user who actually operates the print vending machine 1 is allowed to take out the printed sheets.

According to the above structure, the print vending machine 1 can deal with a plurality of users at once while allowing the users not to stand by the machine to wait and see the printing.

Instead of printing the ad image on the images read from the recording medium, a print sheet whose back surface shows the ad image is employed. That is, the ad images are previously printed on the back surface of the print sheet. According to this case, the user also enjoys cost reduction because the advertiser bears the printing cost fully or partially. The number of the printers is not limited to 8. Arbitrary number of the printers may be applicable, but at least two.

Instead of the sublimation printer exemplified in the above embodiment, various printing method which realizes high quality printing as well as film photo may be employed. For example, general thermal transfer printers may be employed, and kind of the recording sheets and its size are not limited to those described in the above embodiment.

Since the print vending machine 1 allows digital input, a film scanner or a document scanner may be employed as an image input device.

SECOND EMBODIMENT

Figure 14:
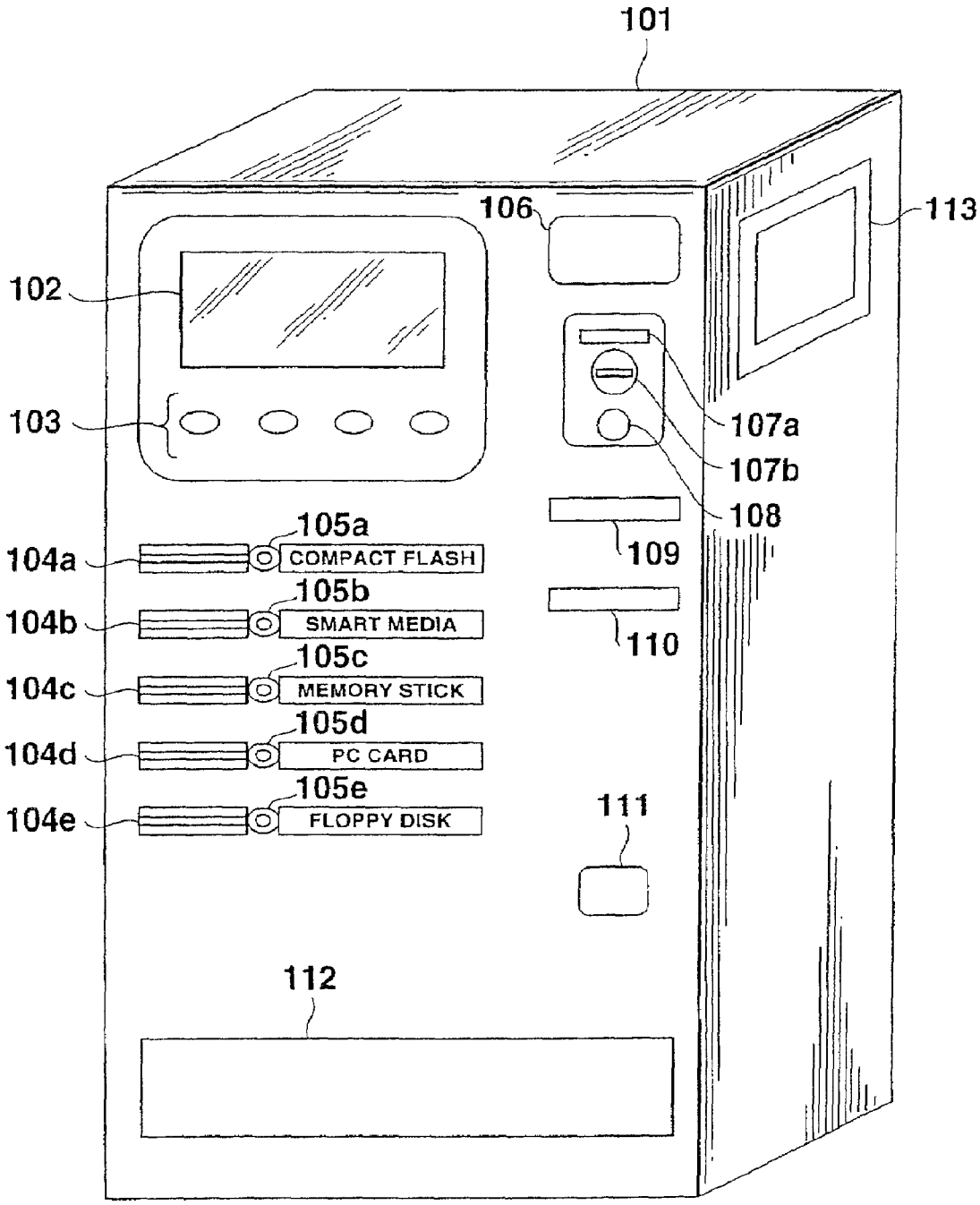
FIG. 14 is a diagram showing the exterior structure of an automatic print vending machine according to a second embodiment of the present invention.

FIG. 14 is a diagram showing exterior structure of an automatic print vending machine according to this embodiment. The print vending machine 101 comprises a display/operation panel (display and touch panel) 102, input keys 103, media slots 104a to 104e, indicator lamps 105a to 105e, a fee display 106, a bill slot 107a, a coins slot 107b, a cancel button 108, a receipt insert slot 109, a receipt outlet slot 110, a change/return outlet 111, and a print outlet 112, which are arranged on a front surface of the vending machine 101. Further, sub displays 113 are formed on both sides of the vending machine 101.

The display/operation panels (display and touch panel) 102 comprises a display such as a liquid crystal display, and an operation panel which operable by a user through keys, buttons, icons, and the like on the display which are, for example, indexed by the user's finger.

The display/operation panel (display and touch panel) 102 displays, for example, thumbnailed images which are captured by a digital camera or the like, and displays option icons for selecting a service mode (pay service or free service).

The user touches the thumbnailed images to designate print quantity individually and selects desired service mode, through the display/operation panel (display and touch panel) 102.

The user is also allowed to do the above operations through the input keys 103.

The sub displays 113 are formed of the liquid crystal displays or the like, and display the same contents as those displayed on the display/operation panel 102 or advertisement images. That is, the sub displays 113 usually display the ad images to show them to waiting customers or persons just walk around, and the contents on the sub displays 113 are switched to the same as those displayed on the display/operation panel 102, in a case where a plurality of users uses the vending machine 1 together. The display switching is controllable by a user with operating the display/operation panel 102 or the input keys 103.

The media slots 104a to 104e accept various kinds of recording media, that is, the media slot 104a accepts a flash memory card, the slot 104b accepts a smart media card, the slot 104c accepts a memory stick, the slot 104d accepts a PCMCIA card, and the slot 104e accepts a floppy disk. The slot 104c has a drawer-like attachment (not shown) which holds a memory stick to insert it in the slot 104c. Appropriate reader is installed in each of the slots 104a to 104e. Each slot also has an anti-static electric brush for avoiding the recoding media and the vending machine 101 from being broken by static electric.

Each of the media slots 104a to 104e has a slope-like media guide which guides a medium so that the medium is inserted upward. Relating to this structure, inner connectors of the media slots 104a to 104e are formed along the slanted guides. The purpose of those structures is to avoid the connectors from being dusty. A dust blower fan is an alternative for the dust-proof structure. Such the dust-proof structure improves reliability of the vending machine 101 placed dusty outdoor.

The recording medium to be inserted into any of the media slots 104a to 104e stores digital images captured by, for example, frame by frame. The digital images may be converted digital data which originates from images captured by a scanner.

The indicator lamps 105a to 105e comprises, for example, LED (Light Emitting Diode), and corresponds to the media slots 104a to 104e respectively for indicating that the media is being inserted. For example, the indicator lamp 105c is lit when a memory stick is inserted correctly in the media slot 104c, thus, a user confirms the right insertion.

The bill slot 107a accept bills and the coin slot 107b accept coins for the pay service mode. The account display 106 displays amount of money corresponding to inserted bill(s) and coin(s). The changes or returned money by cancel are dropped into the change/return outlet 110.

The cancel button 108 is operable by a user to cancel the dealing. The receipt outlet slot 110 provides a user with a receipt on which predetermined information is printed. The receipt insert slot 9 accepts the receipt. The print outlet 12 is a box into which the printed sheets (photos) are dropped.

Figure 15A:
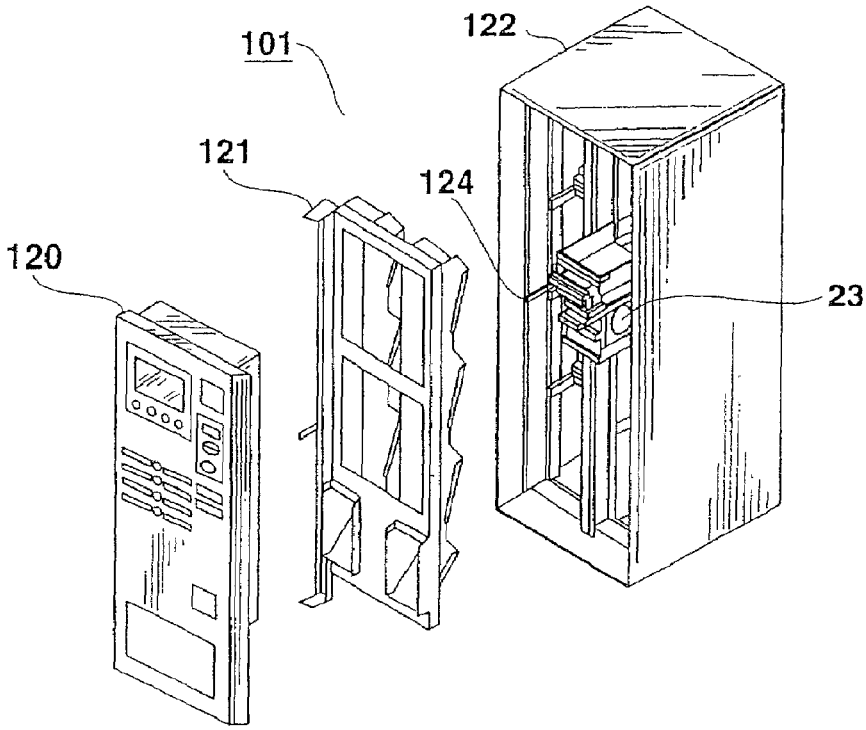
FIG. 15A is an exploded perspective view of the automatic print vending machine according to the second embodiment.
Figure 15B:
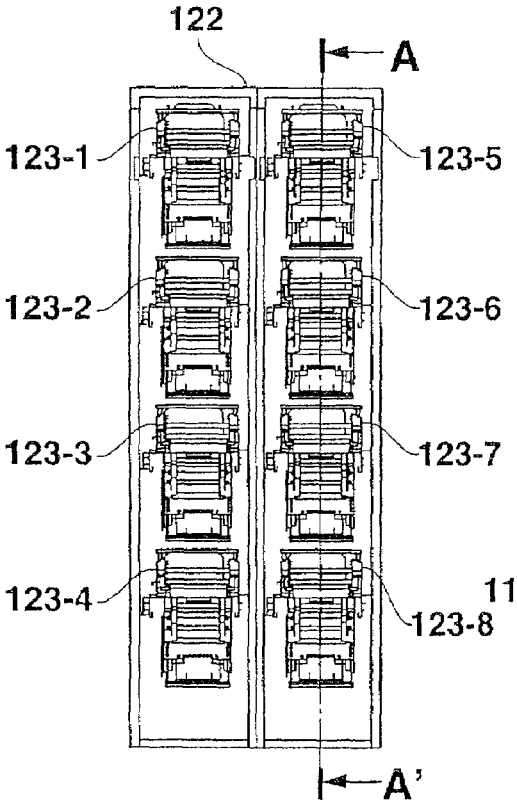
FIG. 15B is a front view of a rear unit section of the vending machine.
Figure 15C:
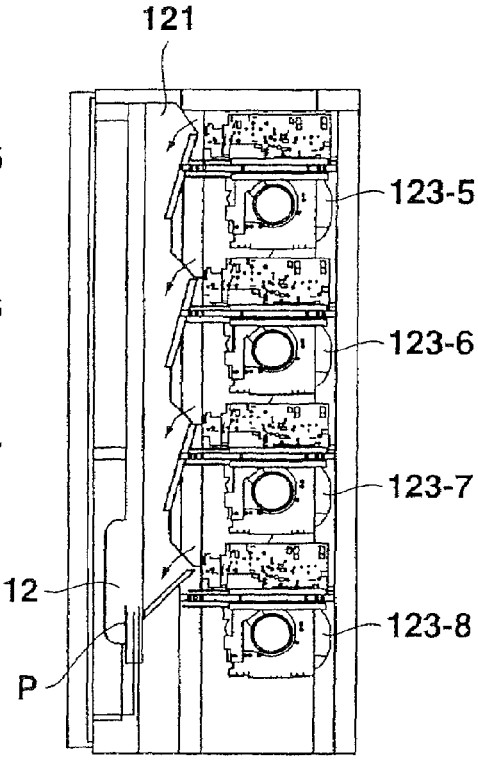
FIG. 15C is a cross sectional view along a line A–A' shown in FIG. 15B.

FIGS. 15A to 15C are diagrams for explaining the internal structure of the automatic print vending machine 1. FIG. 15A is an exploded perspective view of the print vending machine 1. As shown in FIG. 15A, the automatic print vending machine 1 comprises a front unit 120, a paper duct unit 121, and a rear unit 122. The front unit 120 comprises a main controller which controls the automatic print vending machine 1 as a whole, and the display/operation panel (display and touch panel) 102, and the like. The paper duct unit 121 comprises paper ducts each guiding print finished sheets to the sheet outlet 112. The rear unit 122 houses a plurality of detachable unit printers 123, and a power source unit (not shown). Each unit printer 123 is guided by a slide rail 124, thus, mounted at a predetermined position in the rear unit 122. This structure is helpful for recharging expendable supplies easily and quickly. That is, the unit printer 123 itself is exchangeable to a standby printer which has been equipped with new expendable supplies.

Each unit printer 123 has connectors on its back which are connected to another connectors of the rear unit 122 when the printer 123 is installed therein. After the automatic print vending machine 101 is assembled, the connectors of the rear unit 122 are electrically connected to the front unit 120. Therefore, the unit printers 123 are power supplied by the power source unit and communicate with the front unit 120 via the connectors.

FIG. 15B is a front view of the rear unit 122. As shown in FIG. 15B, the rear unit 122 according to this embodiment has capacity for housing 8 unit printers 123.

FIG. 15C is a cross sectional view along a line A–A' shown in FIG. 15B. As shown in FIG. 15C, printed sheets P output by the unit printers 23 are guided by the paper duct 121 toward the print outlet 112.

Figure 16:
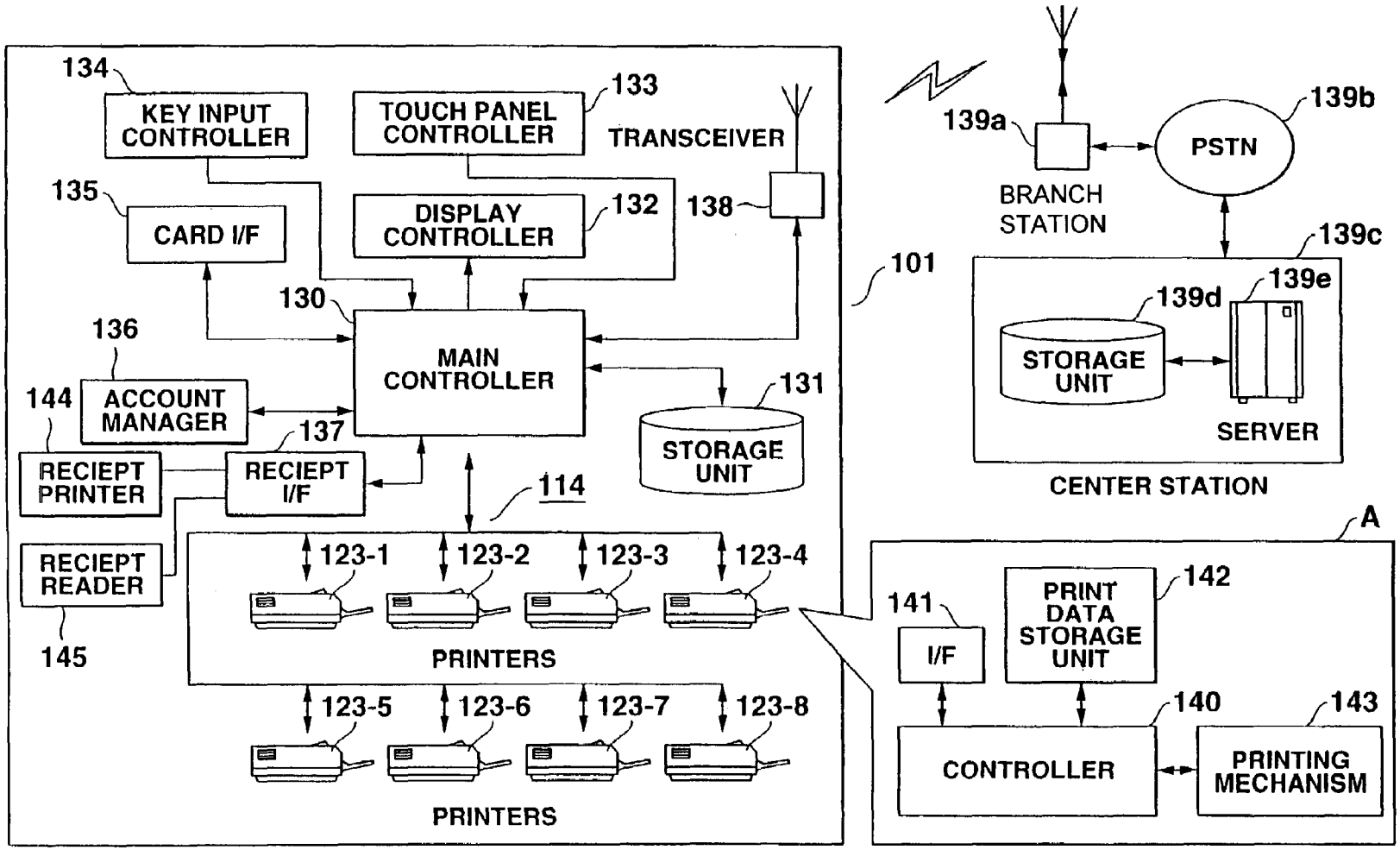
FIG. 16 is a diagram for explaining the system structure in the automatic print vending machine according to the second embodiment.

FIG. 16 is a diagram for explaining the system structure inside the automatic print vending machine 101. The system comprises a main controller 130 and its peripherals, and unit printers 123.

The main controller 130 comprises a CPU (Central Processing Unit) which runs in accordance with a program to control every components in the print vending machine 101. For example, the main controller 130 distributes print information for 1 page to any of the unit printers 123.

The main controller 130 includes a storage unit 131 which stores the program for operations of the main controller 130. In addition to the program, the storage unit 131 stores user information, print conditions, information relating to the unit printers 123 and the like, and those are transferred to a center station (described later) on demand. The storage unit 131 also stores ad information supplied from the center station, and the stored ad information is updated constantly at predetermined intervals.

The peripherals of the main controller 130 are a display controller 132, a touch panel controller 133, a input key controller 134, a card interface (hereinafter, referred to as card I(F) 135, an account manager 136, a receipt interface (hereinafter, referred to as receipt I(F) 137, which a transceiver 138, and those are connected to the main controller 130. The unit printers 123 are also connected to the main controller 130.

The display controller 132 controls information to be displayed on the display/operation panel (display and touch panel) 102 and the sub displays 113. That is, the display controller 132 controls the display/operation panel 102 and the sub displays 113 to display information supplied from the main controller 130.

The card I/F 135 reads digital image data from recording media inserted in the media slot 104a to 104e, and supplies the read data to the main controller 130. The account manager 136 counts bills and coins inserted into the bill/coin slot 107, displays counted value on the fee display 106, and checks whether the account fits the fee in accordance with the designated print quantity. The account manager 136 performs processing in accordance with an instruction given by the main controller 130 which represents service mode, free service or pay service. The account manager also manages the changes.

The receipt I/F 137 establishes connections between a receipt printer 144 and between a sheet reader 145. The receipt printer 144 is, for example, a thermal printer which prints predetermined information on a sheet for receipt. The receipt reader 145 reads information printed on a receipt. The receipt I/F 137 outputs predetermined information supplied from the main controller 130 to the receipt printer 144, and outputs information read by the receipt reader 145 to the main controller 130.

The transceiver 138 transmits/receives information to/from a branch station 139a via a mobile cellar phone network. The branch station 139a is further connected to a center station 139c via a PSTN (Public Switched Telephone Network) 139b, or the like. The center station 139c comprises a storage unit 139d and a server 139e. A service provider contracts with various companies and enterprises, and gathers their advertisement information. The storage unit 139d stores the gathered advertisement information, and information provided by the automatic print vending machine 101 such as user information, print conditions, information relating to the unit printers 123-1 to 123-8, and the like. The server 139e transmits the ad information, user information, and the like stored in the storage unit 139d to the automatic print vending machine 101 on demand via the PSTN 139b or the like, and receives user information, information relating to the unit printers 123-1 to 123-8, and the like from the vending machine 101 via the PSTN 139b or the like.

Figure 17:
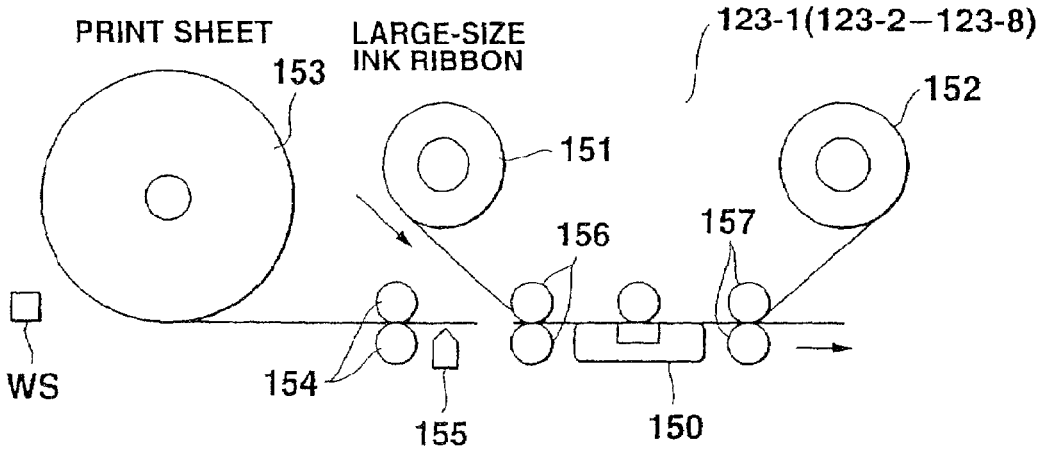
FIG. 17 is a diagram for explaining the structure of a unit printer.

FIG. 17 is a diagram for explaining the structure of each of the unit printers 123-1 to 123-8. Each unit printer 123-1 to 123-8 comprises a thermal print head 150, a large-size ink ribbon 151, a rewinding roller 152, a roll of printing sheet 153, and a plurality of forwarding rollers 154, 156, and 157.

The print sheet 153 is forwarded by a pair of forwarding rollers 154 toward the rollers 156, and a cutter 155 cuts the print sheet 153 at appropriate positions. The roll of the print sheet 153 may have, for example, 102 mm width (maximum), and enough length for providing 500 cut sheets. The large-size ink ribbon 151 comprises yellow (Y) ink bands, magenta (M) ink bands, cyan (C) ink bands, and top coat bands each having the length corresponding to one image size, which are disposed constantly until being enough for 500 cuts of sheets.

Pairs of the forwarding rollers 156 and 157 press the print sheet 153 and the ink ribbon 151 so that they contact each other, and forward them toward the thermal print head 150. The thermal print head 150 comprises heating elements for 1,344 dots (approx. 106 mm) in the main scanning direction with resolution of 322 dpi (dots/inch). The thermal print head 150 receives print data (image data) for each image from a controller 140 (described later), and transfers inks on the ink ribbon 151 to the print sheet 153 in accordance with the print data. Used sections of the ink ribbon after printing by the thermal print head 15 will be rewound by the rewinding roller 152.

In FIG. 16, a reference alphabet A denotes an inner system of each of the printers 123-1 to 123-8 which comprises a print controller 140, an interface (hereinafter, referred to as I/F) 141, print data storage unit 142, and a printing mechanism 143.

The print controller 140 receives the print data for each image from the main controller 130 via the I/F 141, and stores the received print data in the print data storage unit 142. If the main controller 130 supplies print spec information indicating print contrast, color balance, ad image position, or the like to the print controller 140, the print controller 140 retouches or corrects the image data in accordance with the print spec information with using the print data storage unit 142 as a work area. Detail of the printing mechanism 143 is shown in FIG. 17, that is, it comprises the thermal print head 150, the large-size ink ribbon 151, the print sheet 153, and the like.

The print controller 140 reads the print data (for 1 page) from the print data storage unit 142 and prepares an image data set. The prepared image data set is output to the thermal print head 150. The thermal print head 150 turns on the heating elements in accordance with the supplied print data to sublimates small dots of dye of the yellow (Y) ink band, magenta (M) ink band, and cyan (C) ink band toward the print sheet, thus, images are formed thereon.

Each of the unit printers 123-1 to 123-8 further comprises a sheet width sensor which senses the width of the print sheet 153, a sheet emptiness sensor which detects whether the print sheet 153 is supplied or not, an ink ribbon sensor which detects whether enough ink remains on the ink ribbon 151 or not, a malfunction sensor which detects any malfunctions in the printer, a sheet counter which counts remaining sheets of the print sheet 153. The number of available results from the print sheet 153 and the ink ribbon 151 is previously determined, therefore the sheet counter counts (down count) each time 1-page image printing is completed. The sheet counter may be a sensor to counts the remaining sheets.

The detection signals and the number of remaining sheets are supplied to the print controller 140 immediately. The print controller 140 outputs thus gathered data to the main controller 130 as status information of the printers 123-1 to 123-8. Serial Nos. (No. 123-1 to No. 123-8) are previously assigned to the unit printers 123-1 to 123-8 respectively. Each printer sends the status information together with its serial No. to the main controller 130. The printer controller 140 may outputs the status information of the printer spontaneously, or may output it in response to a demand given by the main controller 130.

The main controller 130 manages the status information printer by printer, and stores them on the storage unit 131. The main controller 130 constantly transmits the printer status information to the center station 139c via the branch station 139a and the like. The status information includes registration No. of the automatic print vending machine 101 which is given thereto for identification, alarm code information representing alarm status of expendable supplies, malfunction information, replacement instructions for the ink ribbon 152 and/or print sheets 151, and the like. Transmission of the above information by the main controller 130 depends on demand given by the center station 139c.

The center station 139c informs an administrator of the received status information. For example, in a case where malfunction information relating to the unit printers 123-1 to 123-8 is supplied, the center station 139c informs the administrator of the received information immediately. Thus, the administrator can replace malfunction printer.

Operations of the automatic print vending machine 101 will now be described.

Figure 18:
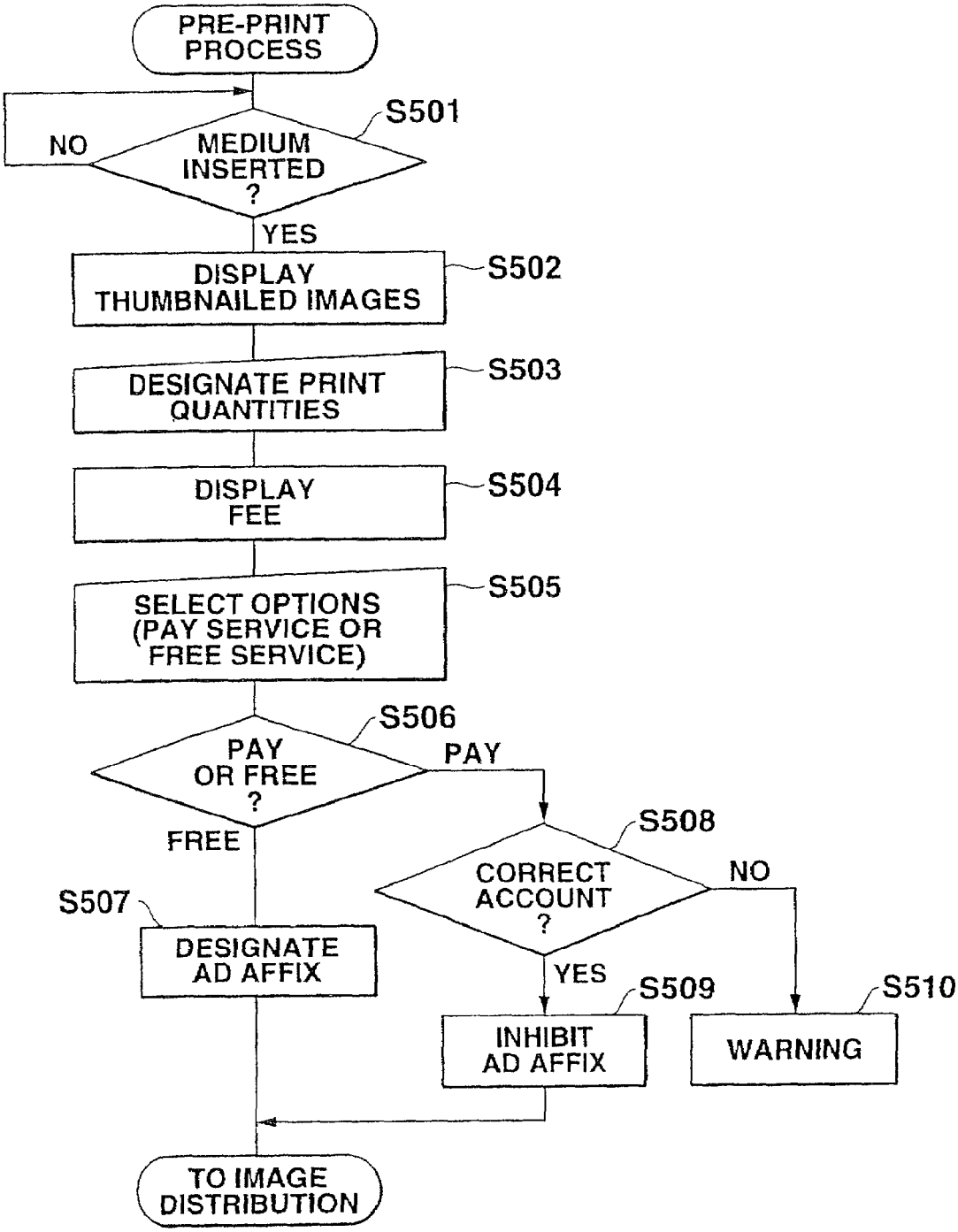
FIG. 18 is a flowchart for explaining processing according to the second embodiment.
Figure 19:
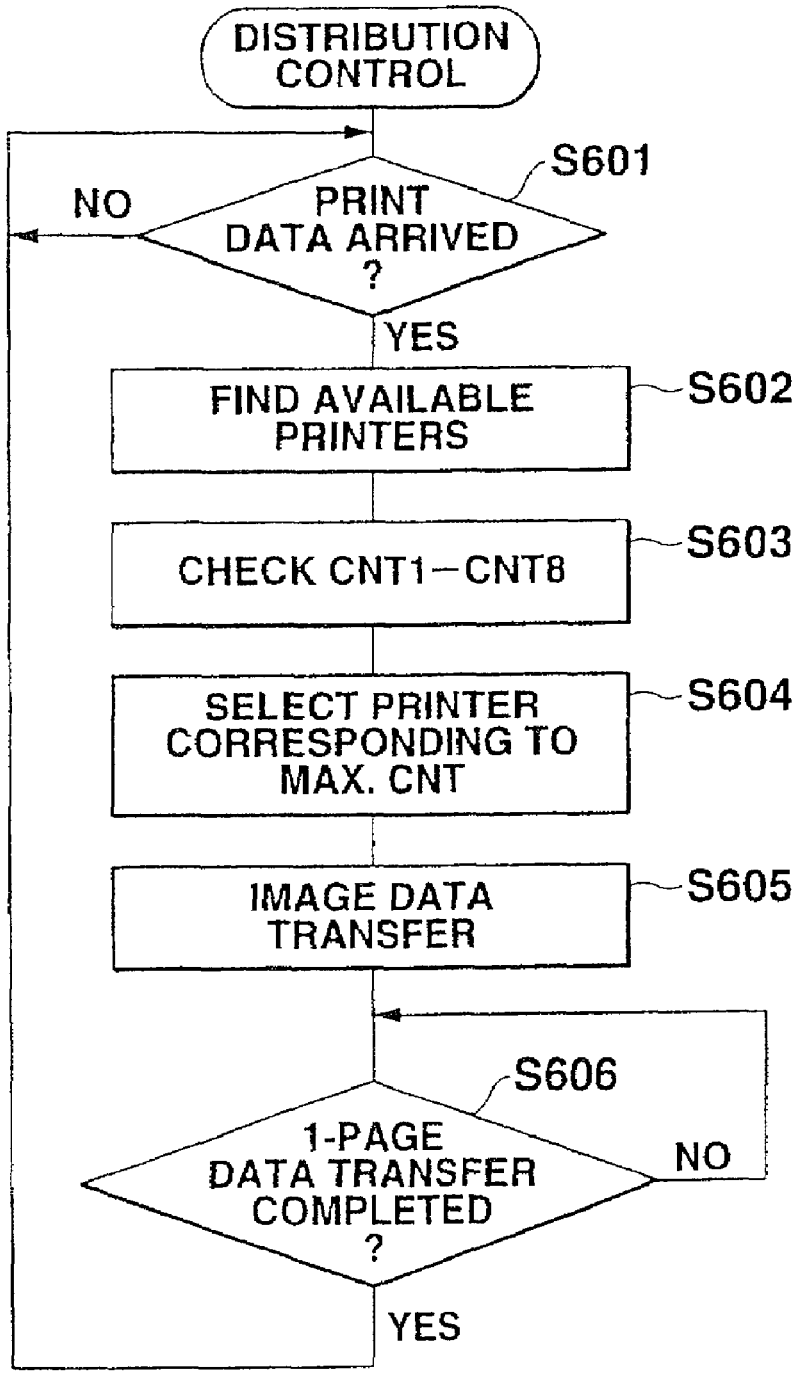
FIG. 19 is a flowchart for explaining an example of distribution processing according to the second embodiment.
Figure 20:
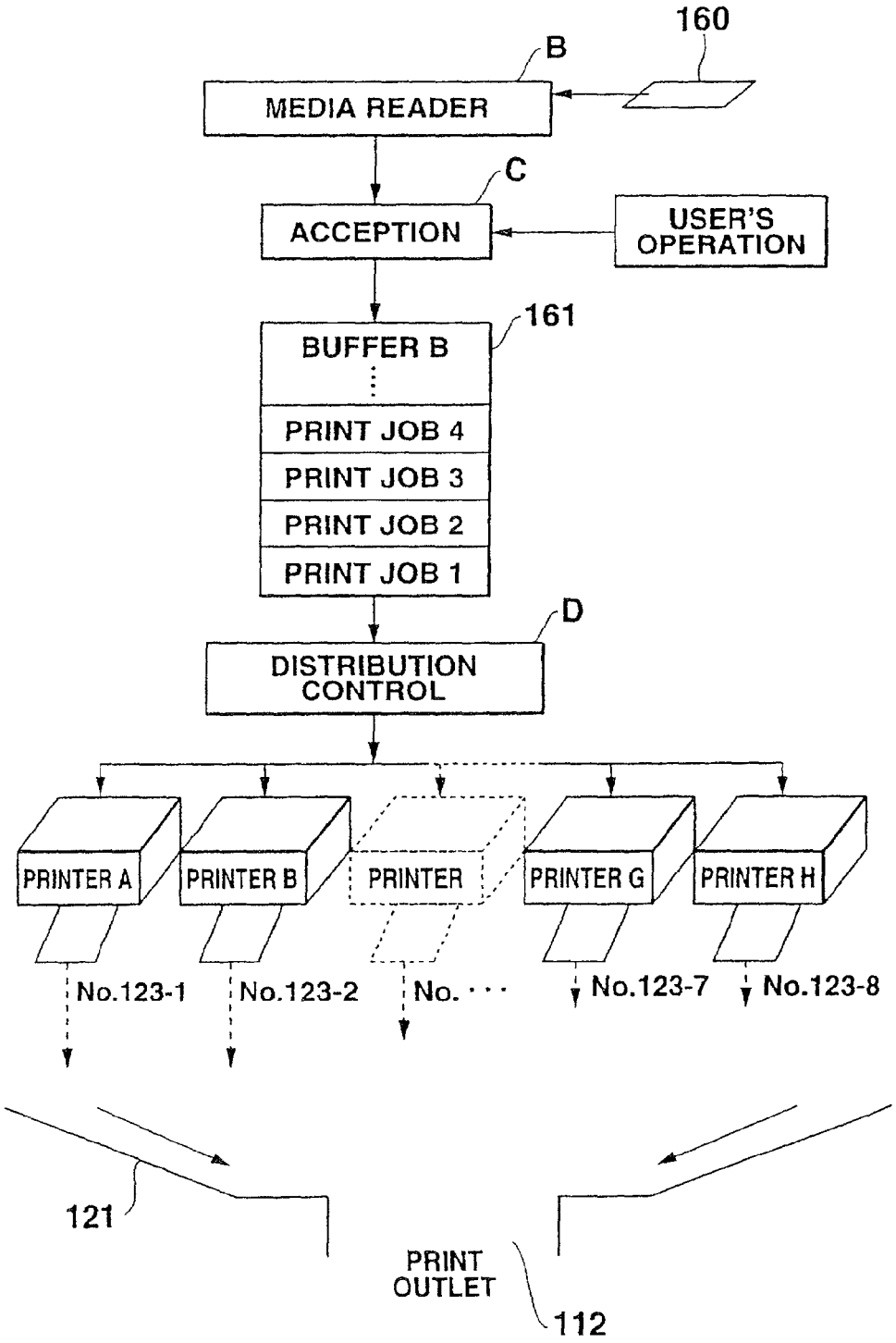
FIG. 20 is a diagram schematically showing the processing according to the second embodiment.

FIGS. 18 and 19 are flowcharts for explaining process flow of the automatic print vending machine 101. FIG. 20 is a diagram schematically showing the process flow of the automatic print vending machine 101. The following explanation is based on the flowcharts shown in FIGS. 18 and 19, and refers to the example related to FIG. 20 as needed.

A user visit the automatic print vending machine 101 and inserts a flash memory card storing digital images which are captured by, for example, a digital camera, into the media slot 104a ("YES" at step S501).

The main controller 130 reads the image data (represented by a reference alphabet B in FIG. 20) from the flash memory card (indicated by a reference numeral 160 in FIG. 20) being inserted, via the card I/F 135. Since frame indexes have been affixed to the image data read from the flash memory card 160, the main controller 130 can identifies each framed image. The main controller 130 temporarily stores the read image data in a buffer A (not shown, but a part of the storage unit 130).

The main controller 130 outputs the images frame by frame based on the frame indexes to the display/control panel 102 via the display controller 132, that is, the display/control panel 102 displays thumbnailed images. In addition to the thumbnailed images, the display/control panel 102 displays predetermined icons (step S502). The main controller 130 accepts the user's input for designating print quantities and service mode (free service or pay service) (represented by a reference alphabet C in FIG. 20).

The user operates the touch panel on the display/control panel 102 or the input keys 103 with referring to the displayed thumbnailed images, to input print quantities image by image (step S503). As additional setting, the user also input print spec such as brightness, contrast, color balance, and the like. An operation signal in accordance with the user's operation is supplied to the main controller 130. The main controller 130 writes image information, print quantity data, print spec information, and the like on the storage unit 131.

The main controller 130 performs account calculation in accordance with the designated print quantities, and displays the result on the display/control panel 102 and fee display 106 (step S504). The fee is calculated by, for example, quantity× price/sheet (depending on print size)+tax.

Then, the user selects the service mode through the mode selecting icons displayed on the display/control panel 102 (step S505). In a case where the user selects the free service mode ("FREE" at step S506), the main controller 130 instructs ad image synthesizing (step S507). In case of the pay service mode ("PAY" at step S506) the main controller 130 checks whether inserted bills and/or coins are enough for the price (step S508). In case of correct account ("YES" at step S508), the main controller inhibits synthesizing the ad image (step S509). In case of incorrect account ("NO" at step S508), the main controller 130 performs warning processing (step S510), for example, displaying a warning message on the liquid crystal display of the display/control panel 102. Pre-print processing is thus completed.

As the pre-print processing is completed, the main controller 130 prepared print job based on the unit image information, the print quantity information, the print spec information, the free/pay information, and the like. The prepared print job is stored in a buffer B 161 (which is a part of the storage unit 131, and is represented by a reference numeral 161 in FIG. 20), and the main controller 130 proceeds to distribution processing shown in FIG. 19 (also shown in FIG. 20 being denoted by a reference alphabet D). In case of the free service mode, advertisement information is affixed to the print job.

Distribution processing will now be described with reference to a flowchart shown in FIG. 19.

The main controller 130 confirms whether the buffer B161 now holds the print job, that is, print information representing an image to be printed (step S601). If there is no print job, the main controller 130 repeats this step until the print job is prepared. If there is the print job ("YES" at step S601), the main controller 130 asks the unit printers 123-1 to 123-8 which ones are now available (step S602). Printers being on duty (printing) and/or out of order are determined as unavailable printers.

The main controller 130 checks counter values representing remaining print sheets in the available printers of the unit printers 123-1 to 123-8 (step S603). The main controller 130 select one of the available printers which shows the largest counter value (step S604). In a case where a plurality of available printers show the same counter values, the main controller 130 selects one to which the smallest registration No. is given.

The main controller 130 starts to transfer print information (including image data) for 1 page, indicated by the print job, to the selected one of the unit printers 123-1 to 123-8 (step S605). The main controller 130 standby for transfer completion (step S606). After the transfer is completed ("YES" at step S606), the flow returns to step S601, and the main controller 130 starts to process the next print information for next 1 page.

The print controller 140 in one of the unit printers 123-1 to 123-8 which is selected at step S604, receives the print information for 1 page from the main controller 130 via the I/F 141. The print controller 140 temporarily stores the receive print information in the print data storage unit 142.

The print controller 140 prepares image data to be printed on the print sheet 153, based on the print information stored in the print data storage unit 142. In case of the free service mode, the print information also includes the advertisement information, therefore, the generated image data set represents an image designated by the user and the advertisement image. The print controller 140 outputs the prepared image data to the print mechanism 143, and starts to drive the print mechanism 143 at a timing of the image data output. The thermal print head 150 transfers inks on the large-size ink ribbon 151 to the print sheet 153 in accordance with the supplied image data, thus, the image is printed. The print sheet 153 on which the image has been printed is cut at a predetermined position. Such the cut print sheets 153 are sequentially ejected from the unit printers 123-1 to 123-8 as shown in FIG. 20. The ejected sheets are dropped into the print outlet 112 via the duct 121.

Figure 21A:
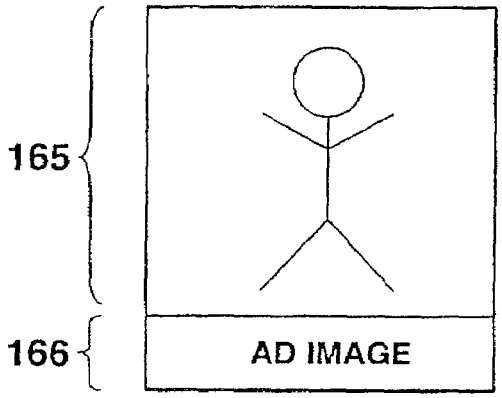
FIG. 21A is a diagram showing a result of free service mode.
Figure 21B:
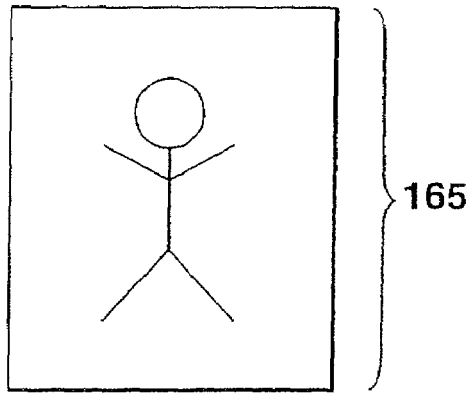
FIG. 21B is a diagram showing a result of pay service mode.

FIGS. 21A and 21B show examples of resultant prints output by the automatic print vending machine 101. FIG. 21A exemplifies a resultant print when the free service mode is selected, and FIG. 21B exemplifies the other one resulting from the pay service mode. As shown in FIGS. 21A and 21B, only an image designated by the user is printed in case of the pay service mode, while the result of the free service mode includes a user designated image 165 and an advertisement image 166.

As described above, the automatic print vending machine 101 has the unit printers 123-1 to 123-8 each having the print controller 140 which generates image data to be printed on the print sheet 153 and the print mechanism 143 which forms images. This structure allows parallel operation with the plural printers, thus, realizing high speed printing.

The main controller 130 selects one which shows the largest number of the sheets from available ones of the unit printers 123-1 to 123-8, and transfers print information to the selected printer. This structure allows non-stop operation if all of the unit printers 123-1 to 123-8 are available ones, thus, improving print speed of the automatic print vending machine 101.

The print information distribution in the above manner may equalize usage of the ink ribbons 151 and the print sheets 153 in the unit printers 123-1 to 123-8. Since the expendable supplies are exhausted equally, the unit printers 123-1 to 123-8 require exchange of their expendable supplies at almost the same timing. This releases the administrator from troublesome exchanging works, because he/she is required to visit the vending machine 101 once for exchanging all expendable supplies therein. Accordingly, the above method for distributing the print information is useful for a case where it is difficult for the administrator to frequently visit the vending machine 101 because of, for example, conditions of location, or the like.

The above described method realizes one-visit-to-exchange, however it brings a long time operation for the supply exchange, because all expendable supplies in the vending machine 101 are exchanged at once. During the supply exchange operation, the vending machine 101 must rest. A case where many customers utilizes the automatic print vending machine 101 while the administrator stands by near the vending machine 101, require another approach for print image distribution for improved sufficiency. Another method for distributing the print information will now be described.

Figure 22:
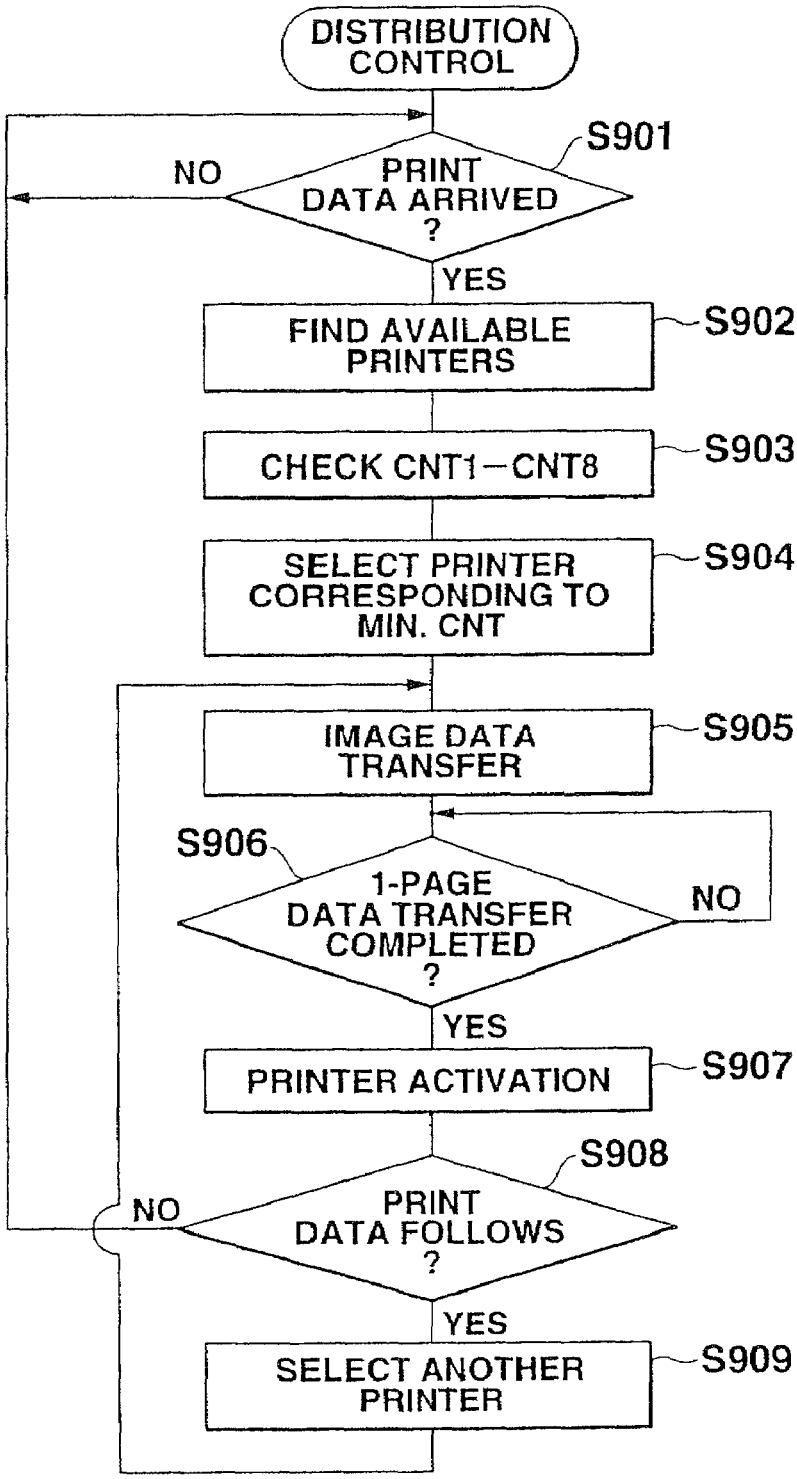
FIG. 22 is a flowchart of another example of the distribution processing according to the second embodiment.

FIG. 22 is a flowchart for explaining distribution processing which differs from that shown in FIG. 19. In the flowchart shown in FIG. 22, steps S901 to S903 are the same as steps S601 to S603 of the flowchart shown in FIG. 19.

After confirming the number of remaining sheets in each of the unit printers 123-1 to 123-8, the main controller 130 selects one which shows the least number of remaining sheets, from available ones of the unit printers 123-1 to 123-8 (step S904). Simultaneously, the main controller 130 determines distribution order following to the selected printer. More precisely, the printer selected at step S904 is the first one, and the others follow in their registration No. order. In a case where, for example, the printer of registration No. 123-5 is selected at step S904 and all printers are available, print information sets are transferred to the unit printers in the following order: No. 123-5, No. 123-6, . . . , No. 123-8, No. 123-1, No. 123-2, . . . , No. 123-4.

After the distribution order is determined, the main controller 130 starts to transfer the print information for 1 page to the printer which is selected at step S904 from the unit printers 123-1 to 123-8 (step S905). After the transfer is completed ("YES" at step S906), the main controller instructs the print mechanism 143 in the printer concerned to start printing (step S907). According to the above example, the unit printer 123-5 receives first print information set from the main controller 130, and starts printing.

The main controller 130 discriminates whether the next print job follows to the current print job or not (step S908). If there is the next print job ("YES" at step S908), the main controller 130 selects the next unit printer (step S909), and the flow returns to step S905. According to the above example, next print information set is transferred to the unit printer 123-6. As long as the print jobs exist ("YES" at step S908), the print information sets will be transferred to appropriate printers sequentially. On the contrary, if there is no print job ("NO" at step S908), the flow returns to step S901 and the main controller 130 stands by for print job arrival.

According to this method shown in FIG. 22, first print information set for 1 page (that is, representing each unit image) is always transferred to a printer which has the least number of remaining sheets, and following print information sets are sequentially transferred to the other printers in printer's registration No. order. Since the printer having the least remaining sheet is always selected as the first printer, specific ones of the printers exhaust their expendable supplies earlier. As a result, the expendable supply exchange timings differs from each other printer by printer. It reduces interval time for exchanging the expendable supply in the vending machine 101 each time, thus, the user's waiting time for supply exchange is also reduced.

With sufficient arrangement of supply exchange operation, the user's waiting time is reduced more. In a case where, for example, any one of the unit printers 123-1 to 123-8 exhausts its expendable supply during day time when many customers arrive, the administrator should not exchange it immediately but does it during night time where a few customers arrive. This maneuver is helpful for reducing the user's waiting time down to substantially 0.

In the above two methods for print information distribution, the unit printers 123-1 to 123-8 hold the same type of the print sheets 153. Each of the unit printers 123-1 to 123-8 may be compatible with different types of print sheets (for example, sheet size). Distribution processing suitable for such the case will now be described.

Figure 23:
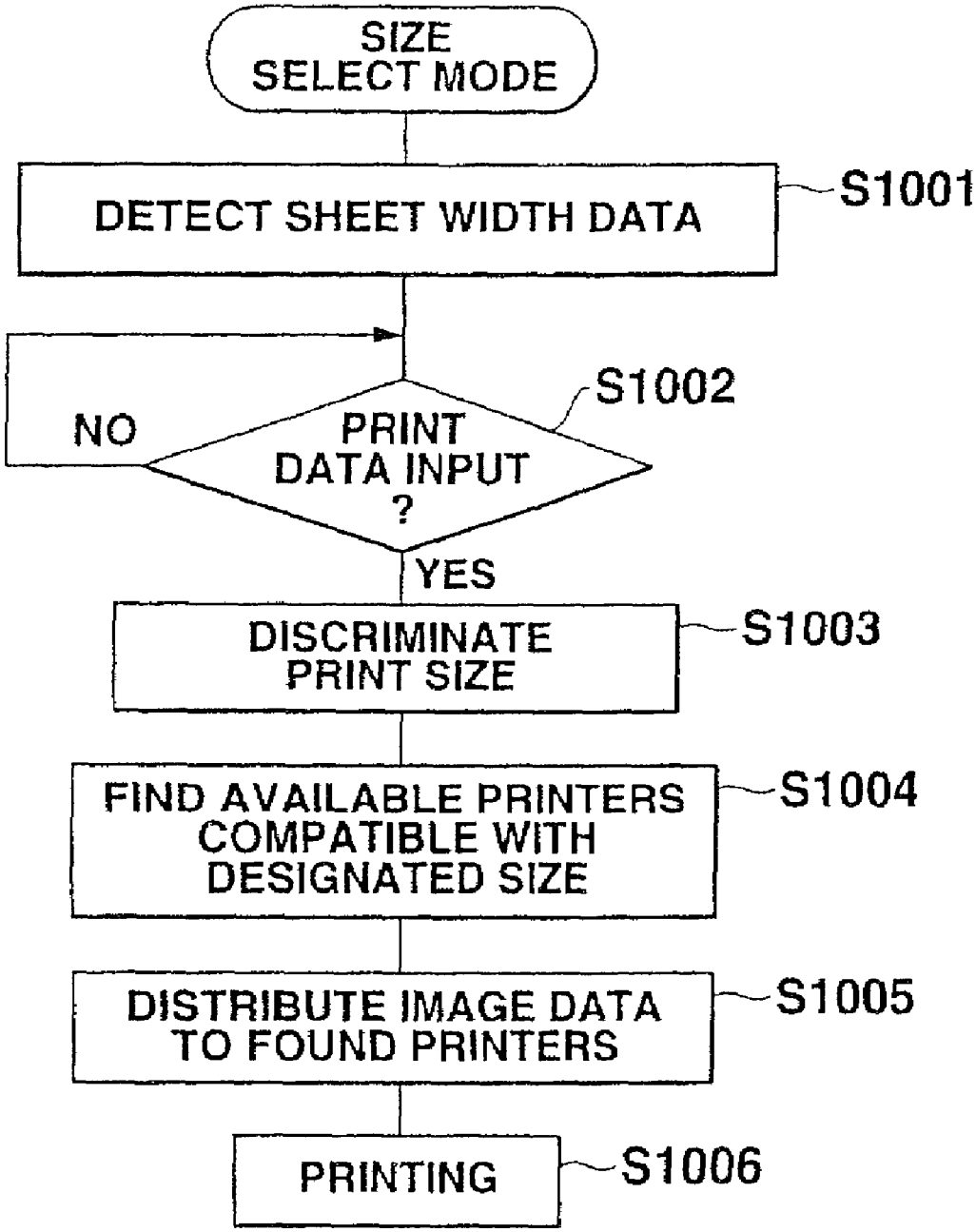
FIG. 23 is a flowchart of still another example of the distribution processing according to the second embodiment.

FIG. 23 is a flowchart for explaining such the distribution processing. For comprehensive explanation, the unit printers 123-1 to 123-3 hold L size print sheets 153, the unit printers 123-4 to 123-6 hold M size print sheet 153, and the unit printers 123-7 and 123-8 hold S size print sheet 153.

In this case, a user designates print size during the pre-print processing (represented by a reference alphabet C in FIG. 20). More precisely, each time the user designates desired images through the thumbnailed images displayed on the display/operation panel 102, the user may also indexes predetermined icons on the display/operation panel 102 indicating print sizes ">L", "M", and "S". Additionally, M size may be automatically set as default size when the user does not designate the print size.

In response to power on, each of the unit printers 123-1 to 123-8 detects size of the print sheets 153 with using a sheet width sensor WS (see FIG. 17), and the detection results are input to the print controller 140. Each print controller 140 informs the main controller 130 of the detection results given by the relating sheet width sensor WS. Thus, the main controller 130 recognize widths of the print sheets 153 in the unit printers 123-1 to 123-8 (step S1001). The sheet width sensor WS detects the sheet width by sensing the position of an upright plate which is slidably moved in accordance with the sheet width in a sheet cassette. The main controller 130 may asks the unit printers 123-1 to 123-8 the sheet size respectively.

After the pre-print processing shown in FIG. 18, the main controller 130 prepares print jobs and stores them in the buffer B161 (see FIG. 20). After confirming that the buffer 161 holds the print job ("YES" at step S1002), the main controller 130 reads the print information included in the print job to determine the sheet size (step S1003).

The main controller 130 select ones from the unit printers 123-1 to 123-8, which are available and compatible with the determined sheet size (step S1004). If the designated print size is "L size", for example, the unit printers 123-1 to 123-3 are selected. Then, the main controller 130 transfers print information sets to predetermined ones of the selected unit printers 123-1 to 123-8 (step S1005). Destinations of the print information sets are determined by the distribution control shown in FIG. 19 or FIG. 20. Each of the predetermined ones of the unit printers 123-1 to 123-8 receives the print information set, and drives its print mechanism 143 in accordance with the received print information set to perform printing (step S1006).

In this case, the automatic print vending machine 101 comprises the unit printers 123-1 to 123-8 being compatible with various sheet sizes, and the main controller 130 transfers the print information sets to the unit printers which hold print sheets corresponding to the size designated by a user. The above distribution control allows the user to designate desired size of sheet for printing desired images. In addition to the printer selection by size, the unit printers may be selected based on texture type of the sheets (coated sheet, post card, and the like). In this case, each of the unit printers 123-1 to 123-8 may comprise a sensor which detects texture type of the sheets 153 instead of the sheet width sensor WS.

Figure 24:
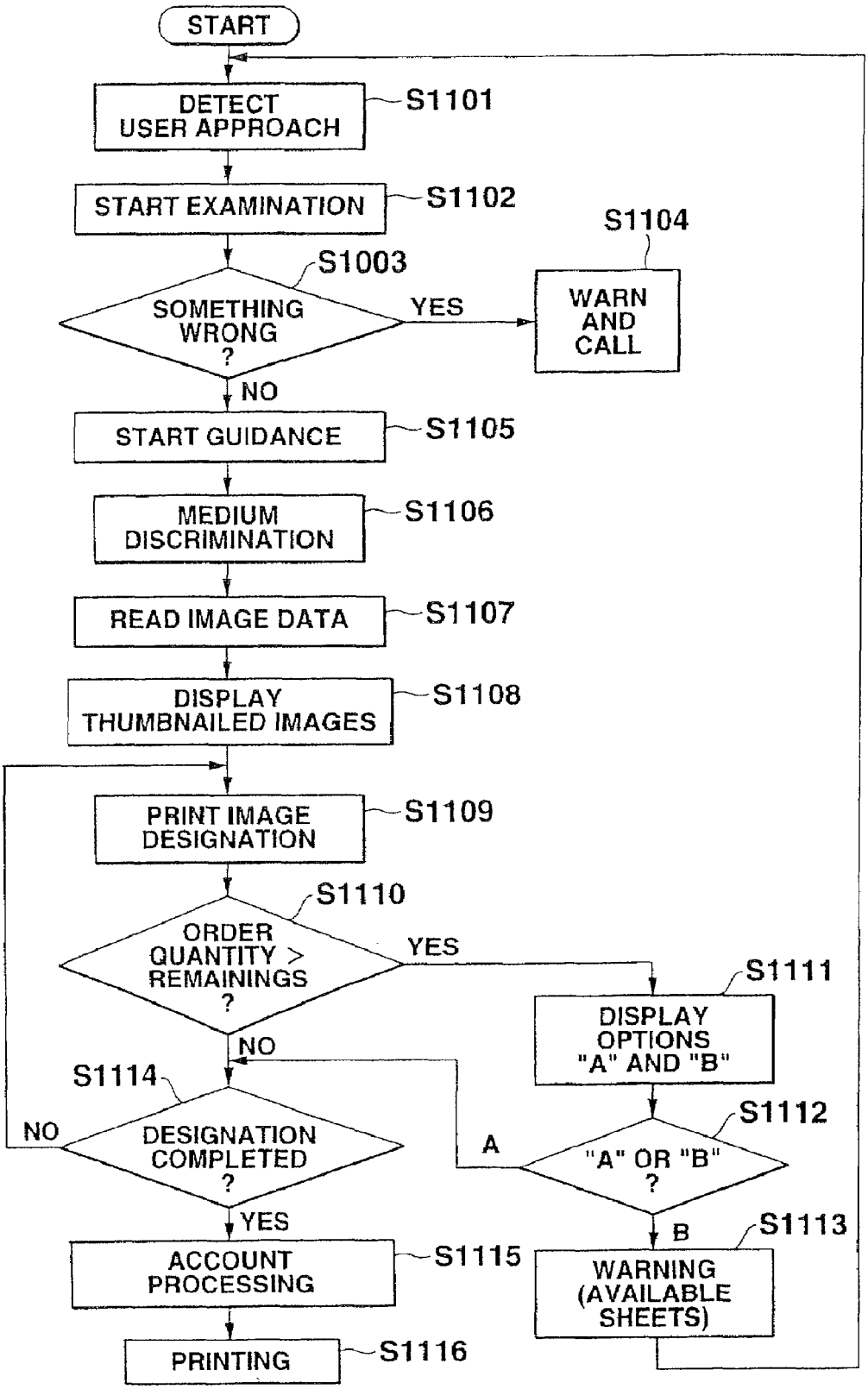
FIG. 24 is a flowchart for explaining paper empty warning processing.

The automatic print vending machine 101 according to this embodiment may have warning function which informs a user of print sheet exhaustion in the unit printers 123. FIG. 24 is a flowchart for explaining processing for the case of the warning function.

An approach sensor on the automatic print vending machine 101 senses that a user is approaching to the vending machine 101 (step S1101). The approach sensor provide the main controller 130 with a detection signal, and the main controller 130 examines status of the automatic print vending machine 101 and expendable supplies in the unit printers 123-1 to 123-8 (number of remaining sheets, and the like) (step S1102). The main controller 130 determines whether the vending machine 101 is in unusual situation (including a case of supply shortage) or not (step S1103). If something is wrong with the vending machine 101 ("YES" at step S1103), the main controller 130 controls the display/control panel (liquid crystal display and touch panel) 102 to display a message representing that the vending machine 101 is now unavailable with sound alarm, while informing the administrator in the center station 139c (step S1104).

In a case where nothing is wrong ("NO" at step S1103), the main controller 130 controls the display/control panel (liquid crystal display and touch panel) 102 to display guidance message together with sounding voice guidance (step S1105). The user inserts a recording medium into the appropriate on of the media slots 104a to 104e in accordance with the guidance message. The main controller 130 recognize the media insertion at any one of the media slots 104a to 104e (step S1106), and reads image information stored in the inserted recording medium (step S1107). The main controller 130 recognizes unit frames (images by one capturing operation), and displays the thumbnailed images on the display/operation panel (liquid crystal display and touch panel) 102 (step S1108).

The user then designates desired images to be printed, by indexing the thumbnailed images, and inputs print quantities of the designated images (step S1109). Each time the print quantity is input, the main controller 130 compares print quantities input so far with the number of remaining sheets which is obtained at step S1102 (step S1110).

When the designated total print quantity exceeds the remaining sheets ("YES" at step S1110), the main controller 130 controls the display/operation panel 102 to display a message representing that printing with the designated quantity is impossible, and no longer allows the user to input print quantity. Then the main controller 130 provides the user with option whether printing with the quantity designated so far or canceling the designated quantities (step S1111). The main controller 130 may inform the center station 139c of sheet shortage.

In case of canceling the designated quantities ("B" at step S1112), the main controller 130 displays the number of remaining sheets on the liquid crystal display of the display/operation panel 102 (step S1113). The main controller 130 also informs other users approaching the vending machine 101 of print sheet shortage, through the display/operation panel 102.

In a case where the user selects another option, that is, printing with the quantities designated so far ("A" at step S1112), the main controller 130 determines whether the quantity designation by the user is completed or not (step S1114). If the designation is incomplete or the user wants to re-input ("NO" at step S114), the flow returns to step S1109 to do print quantity designation again. If the quantity designation has been completed ("YES" at step S1114), the main controller 130 displays fee corresponding to the designated quantities, and the like on the liquid crystal display of the display/operation panel 102. The main controller 130 confirms inserted bills and coins, and provides the user with the changes as needed through the change/return outlet 111 (step S1115). This step may be skipped to step S1116 in case of the free service mode.

Thus, the pre-printing process (indicated by a reference alphabet C in FIG. 20) is completed, then the main controller 130 prepares print jobs and distributes the print information sets to the unit printers 123-1 to 123-8. The printers which receive the print information set start the printing (step S1116). A method same as that shown in FIG. 19 or FIG. 20 is applicable to the print information distribution.

The above described structure avoids the user from extra unnecessary designation for substantially impossible printing. This structure also allows the user to select printing with quantity designated so far or cancel the designate quantities. This prevents extra fee collection.

Figure 25:
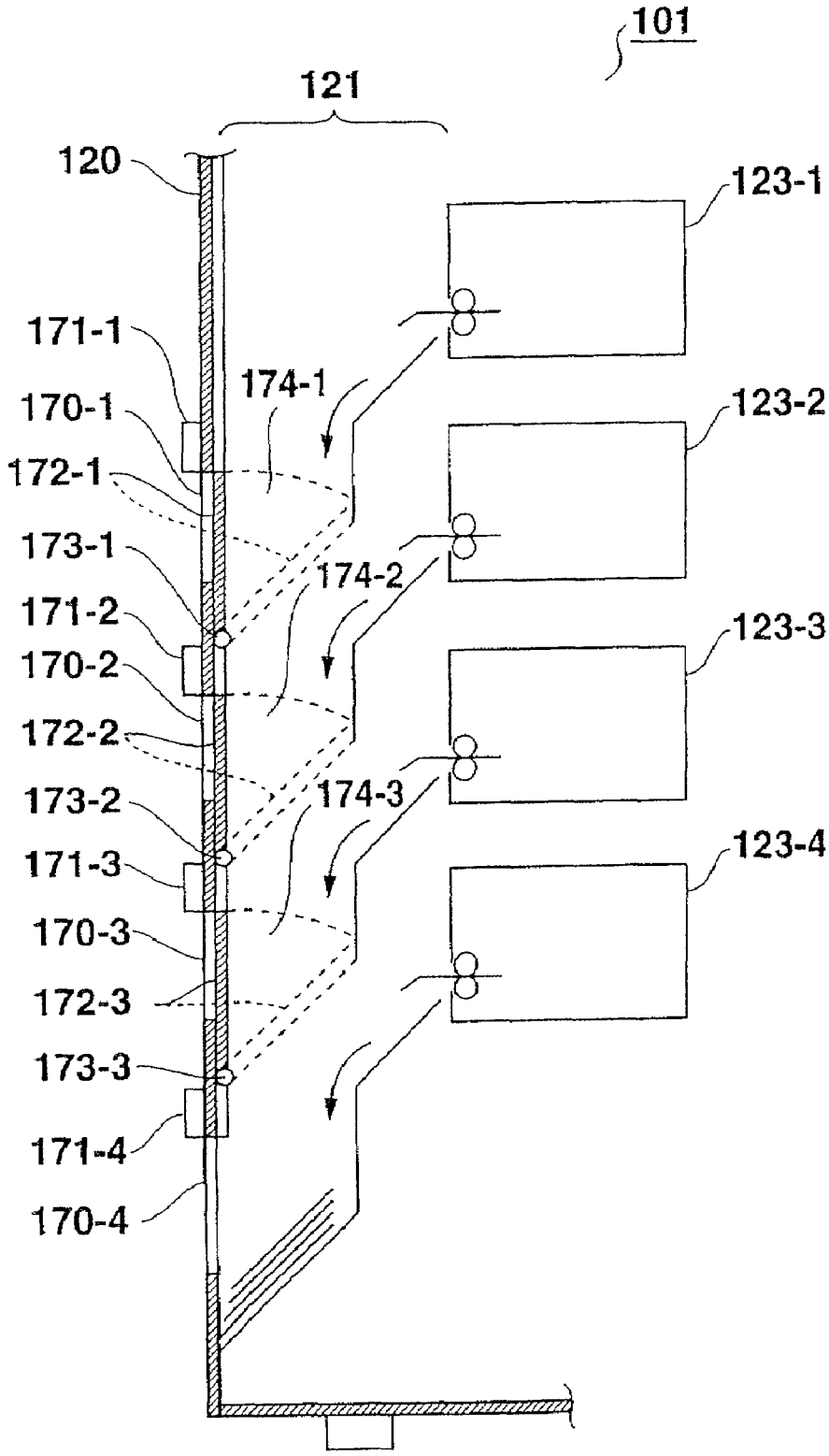
FIG. 25 is a simplified diagram for explaining mechanisms of a plurality of print outlets.

In the above description, the resultant print sheets are gathered at the print outlet 112 through the duct 121. Instead of this structure, the automatic print vending machine 101 may comprise a plurality of the print outlets 112 which will be assigned to print jobs respectively for processing the print jobs parallel. FIG. 25 is a diagram schematically showing the mechanism of the print outlet 112 of the vending machine 101 for explaining this structure. Although FIG. 25 is simplified to show only the unit printers 123-1 to 123-4, the other unit printers 123-5 to 123-8 also have the same structure. For comprehensive explanation, the following describes only the unit printers 123-1 to 123-4.

The automatic print vending machine 101 comprises print outlets 170-1 to 170-4 which are paired with the unit printers 123-1 too 123-4 respectively. The front unit 120 comprises indicators 171-1 to 171-4 near the print outlets 170-1 to 170-4 respectively. The indicators 171-1 to 171-4 indicate ID representing print jobs designated by users. The user refers to the indicators 171-1 to 171-4 to find which outlet outputs his/her prints.

The ID may be issued at the user finishes the pre-print processing (indicated by a reference alphabet C in FIG. 20). The ID is also printed on the receipt together with, for example, estimated print complete time, and the receipt is output from the receipt outlet 10. The ID and the estimated print complete time are also displayed on the liquid crystal display of the display/operation panel 102. The estimated print complete time is calculated with reference to the number of unprocessed print jobs, operation status of the unit printers 123-1 to 123-8, and the like.

This structure releases the users from standing by the vending machine 101 for waiting, until the estimated print complete time since the ID was issued. At the estimated time, the user may approach the vending machine 101 and picks up his/her prints from the outlet where the indicator 170 indicates his/her ID. Moreover, next user can immediately follow to use the vending machine 101 without waiting for completion of outputs for the former user.

The paper duct 121 may comprise rotatable guiding plates 172-1 to 172-3 for guiding all resultant prints to the bottom outlet 170-4. Ordinary positions of the guiding plates 172-1 to 172-3 are shown by solid lines in FIG. 25, thus resultant prints are dropped to the outlet 1704. The guiding plates 172-1 to 172-3 may be rotated on shafts 173-1 to 173-3 so as to slant as shown by broken lines in FIG. 25, thus sheet stacking units 174-1 to 174-3 are formed. The resultant prints output by the unit printers 123-1 to 123-4 are guided to the outlets 170-1 to 170-4 respectively.

For example, slanting all guiding plates allows one-to-one relationship between a print jot and one unit printer, therefore, 8 users can use the automatic print vending machine 101 simultaneously with parallel processing. Or, one print job may be assigned to two unit printers by slanting the guiding plate 172-2 (and another one corresponding to the unit printer 123-6). In this case, 4 users can use the vending machine 101 simultaneously with parallel processing. In conclusion, thus structured automatic print vending machine 101 allows a plurality of users to use the vending machine 101 simultaneously with parallel processing because the unit printers 123-1 to 123-8 are divided into several groups.

Figure 26:
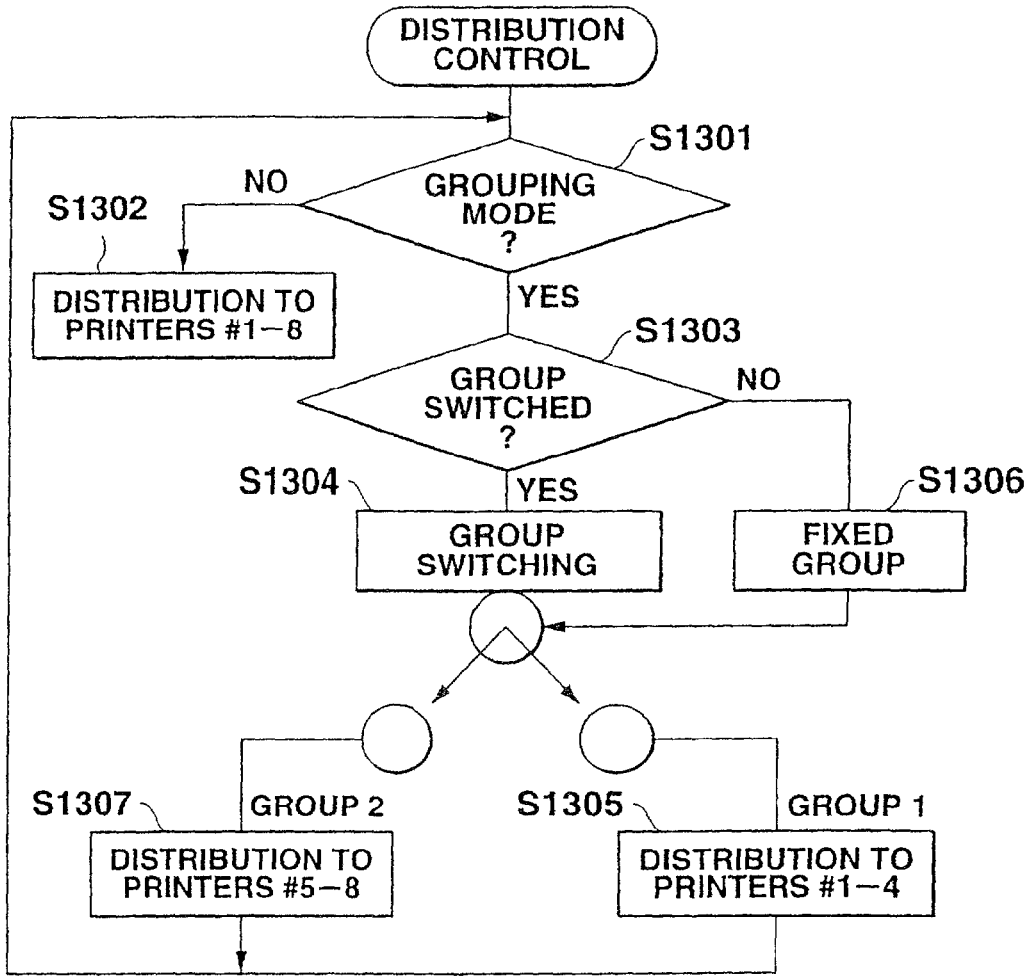
FIG. 26 is a flowchart of an example of the distribution processing according to the second embodiment.

FIG. 26 is a flowchart for explaining distribution control in thus structured automatic print vending machine 101. In this case, 8 printers are divided into two groups, that is, the unit printers 123-1 to 123-4 belong to Group 1, while the unit printers 123-5 to 123-8 belong to Group 2. The guiding plates are arranges so that resultant prints output by the unit printers 123 belonging to Group 1 are gathered at the outlet 170-4, while resultant prints output by the unit printers 123 belonging to Group 2 are gathered at another outlet 170-8.

For example, two users have dealt with the pre-print processing (represented by the reference alphabet C in FIG. 20), and two print jobs corresponding to the users respectively have been stored in the buffer B161. Under this situation, the main controller 130 starts to execute distribution control processing shown in FIG. 26 after recognizing that there are print jobs in the buffer B161.

The main controller 130 confirms whether the present mode of the automatic print vending machine 101 is group (GRP) mode or not (step S1301). Mode setting has been done by the administrator previously. If the other mode (that is, normal mode) is set ("NO" at step S1301), the main controller 130 distributes print information to all available ones of the unit printers 123-1 to 123-8. In this case, aforementioned method shown in FIG. 19 or FIG. 22 is applicable to the distribution.

In case of group mode ("YES" at step S1301), the main controller 130 determines whether the print job will be switched or not (step S1303). According to the above example, the print jobs will be switched because there are two print jobs in the buffer B161. In case of print job switching ("YES" at step S1303), the main controller 130 executes group switching processing (step S1304). Through this processing, the main controller 130 designates any one of Groups 1 and 2 as a destination of the print information. As initial setting, Group 1 is designated first. The main controller 130 transfers the print information sets of the print job 1 to any of the unit printers 123-1 to 123-4 belonging to Group 1 (step S1305). Print information sets may be distributed in Group 1 in accordance with the method shown in FIG. 19 or FIG. 22.

After the print information distribution for the print job 1 is completed, print job switching from print job 1 to print job 2 is required ("YES" at step S1303), therefore, the main controller 130 carries out group switch processing to designate Group 2 (step S1304). The main controller 130 transfers print information sets of the print job 2 to any of the unit printers 123-5 to 123-8 belonging to Group 2 (step S1307). Print information sets may be distributed in Group 2 in accordance with the method shown in FIG. 19 or FIG. 20.

If the print job still has print information set(s) for following sheet(s) when print information set transfer for 1 page is completed, print job switching is unnecessary ("NO" at step S1303). In this case, group switching process is canceled (step S1306), and the print information distribution in Group 1 or Group 1 continues.

According to the above processing, each of plural users can share the unit printers 123-1 to 123-8 group by group, thus they can use the automatic print vending machine 101 simultaneously.

The aforementioned receipt may show user information in addition to estimated print complete time and ID indicating which outlet 112 outputs the print. More precisely, the storage unit 131 or the storage unit 139d in the center station 139c stores print spec information user by user at a user uses the vending machine 101, and the vending machine 101 issues receipt which shows user information for identifying the stored print spec information. If the user wants to print images with the same print spec next time, the vending machine 101 reads the receipt on which the user information is printed and fetches the print spec information from the storage unit 131 or the like based on the read user information. Then, the printing will be done in accordance with the fetched print spec information.

Figure 27:
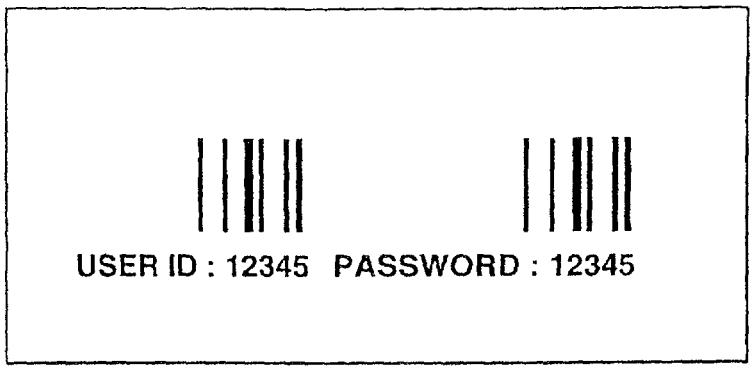
FIG. 27 is a diagram showing user information printed on a receipt.

FIG. 27 exemplifies user information printed on a receipt. As shown in FIG. 27, bar codes representing user 1D and password are printed on the receipt.

If a user designates print spec such as brightness, contrast, and color balance at the pre-print processing (represented by the reference alphabet C in FIG. 20), the automatic print vending machine 101 issues a receipt on which user information is printed. Simultaneously, the user information and print spec information are stored in the storage unit 131 in the vending machine 101, or they are transferred to the center station 139c via the PSTN 139b or the like to be stored in the storage unit 139d.

The user brings the issued receipt to the automatic print vending machine 101 and insert it into the receipt slot 109. The receipt reader 145 reads user information on the inserted receipt, and outputs the user information to the main controller 130 via the receipt I/F 137. The main controller 130 accesses the storage unit 131 to find the print spec information or accesses the storage unit 139d in the center station 139c to ask the print spec, based on the read user information. The main controller 130 prepares print job(s) so as to have the same print spec as that represented by the read print spec information corresponding to the user information. This structure releases the user from inputting the same information many times. Since the print spec input is skipped, a time period occupied by one user is reduced. As a result, it improves availability factor of the automatic print vending machine 101 and profit rate.

In a case where the print spec information is stored in the storage unit 139d in the center station 139c together with the user information, the vending machine 101 which reads a receipt may differs from the vending machine 101 which issued the receipt if only they are connected to the center cite 139c.

User information and print spec information stored in the storage unit 131 in the vending machine 101 or in the storage unit 139d in the center station 139c may be deleted in accordance with a timeout instruction which is issued when the user information and the print spec information have not been accessed for a predetermined time period. In a case where the user information is deleted by timeout, the vending machine 101 may displays a message representing the data deletion on the display/operation panel 102 to request the user re-input.

Instead of printing user information, the user information may be, for example, displayed on the liquid crystal display of the display/operation panel 102 without issuing a receipt. The user may write down the displayed user information (user ID and password), and he/she may input the user information by operating the display/operation panel 102 or the input keys 103 at next use. The storage unit 131 or the storage unit 139d in the center station 139c may store image information in addition to the user information and the print spec information. In this case, the user is released from bringing a recording medium. A rolled sheet may be usually employed for the receipt, however, a paper card receipt, a plastic card receipt, or the like may be applicable. Such the card type receipt is hardly bent, therefore, misreading by the receipt reader 145 will be reduced.

In the above description, the unit printers 123-1 to 123-8 are powered by the power source unit mounted in the rear unit 122. In a thermal printer, output properties of thermal print heads are uneven even with constant power supply, because performance or characteristics of component parts in the thermal print heads are not equivalent completely. The uneven properties may results uneven printed images. A built-in memory in the print controller 140 may store power voltage index for thermal print head 150 in accordance with their output properties, in order to avoid uneven printed images resulting from the unit printers 123-1 to 123-8. The main controller 130 fetches the power voltage indexes from the printer controllers 140 when the unit printers 123-1 to 123-8 are installed in the automatic print vending machine 101, and controls the power source unit so as to supply appropriate voltages in accordance with the read power voltage indexes.

Figure 28:
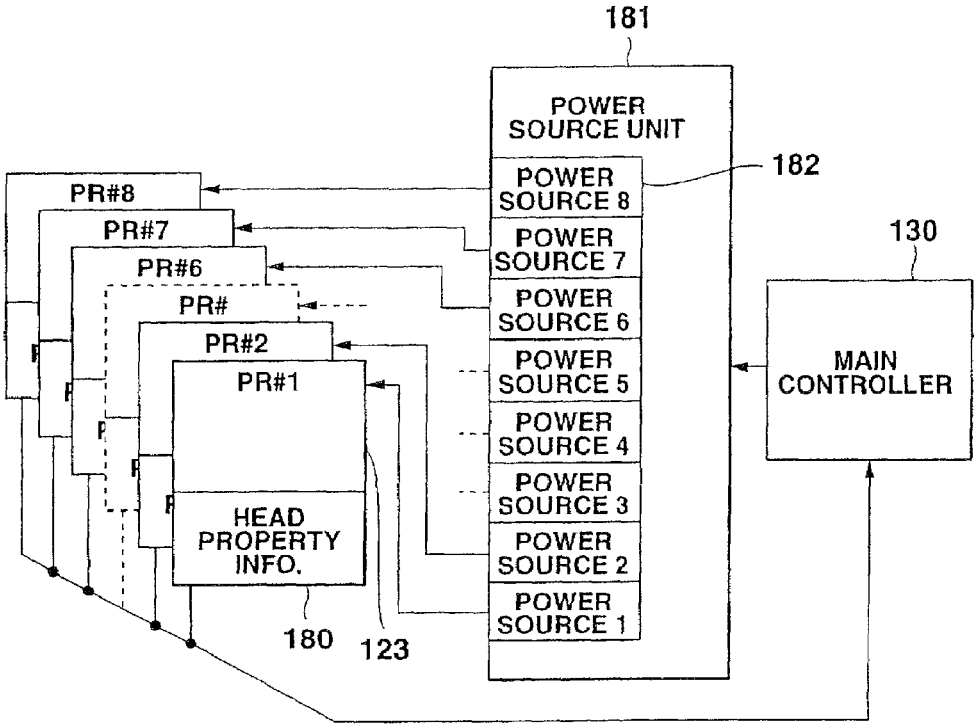
FIG. 28 is a diagram for explaining power supply to each printer.
Figure 29:
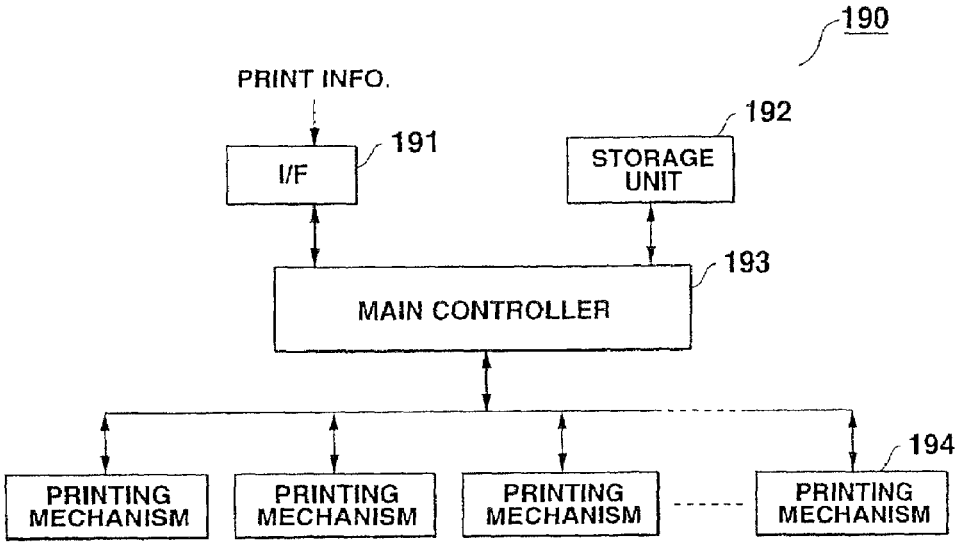
FIG. 29 is a diagram for explaining the system structure in a conventional printing apparatus.

FIG. 28 is a diagram for explaining power supply to the unit printers 123-1 to 123-8.

The print controller 140 in each of the unit printers 123-1 to 123-8 stores head property information 180 representing power voltage indexes for its thermal print head 150. After the unit printers 123-1 to 123-8 are installed in the automatic print vending machine 101, thus, electric connection between the unit printers 123-1 to 123-8 and the main controller 130 is established, the main controller 130 reads the head property information sets 180 from the unit printers 123-1 to 123-8. Under a control of the main controller 130, the power source unit 181 controls power source means 182 which are paired with the unit printers 123-1 to 123-8 respectively, in accordance with the head property information sets 180. This structure provides substantially equal quality resultant prints output by the unit printers 123-1 to 123-8.

In the automatic print vending machine 101, the power source unit may comprise a UPS (uninterruptible power supply) or the like in order to secure power supply during a power failure. With this structure, error prints caused by the power failure may be ejected to a duct box in each of the unit printers 123-1 to 123-8 instead of ejecting them to the print outlet 170.

The invention claimed is:

1. A photographic print vending apparatus comprising:

media accepting means for accepting a removable recording medium having photographic image information stored thereon;

image information reading means for reading the image information from the recording medium;

advertisement information storing means for storing advertisement information;

printing means for printing the image information onto a sheet;

a housing which houses the media accepting means, the image information reading means, the printing means and the advertisement information storing means; and

[an] *a single* outlet in the housing from which the printed sheet is output;

wherein the printing means prints the advertisement information onto the sheet with the image information, when an advertisement information printing mode is set;

wherein the printing means comprises a plurality of printers, each of which is adapted to print the image information on the sheet; and wherein the print vending apparatus further comprises*:*

*status detection means for detecting a status of each of the plurality of printers;* image information distribution means for distributing [the image information read by the image information reading means to at least one of the plurality of printers in accordance with a predetermined sequence, wherein if the image information comprises image information to be printed on a plurality of sheets, a plurality of the printers are assigned to print respective ones of the sheets in accordance with the predetermined sequence] *image information corresponding to a plurality of sheets on a single sheet by single sheet basis, regardless of a number of sheets to be printed and without regard to a number of sheets to be allocated to each printer, to the plurality of printers by switching assignment of the plurality of printers based on a predetermined sequence, so that if one sheet in the plurality of sheets is assigned to one printer, a next sheet in the plurality of sheets is always assigned to another printer, wherein said one printer and said another printer are different from each other; and*

*conveyance means for collectively conveying printed sheets output by the plurality of printers to the single outlet, and ejecting the printed sheets to outside from the single outlet;*

*wherein each of the plurality of printers includes image data generating means for generating image data to be printed on a single sheet based on the image information distributed from the image information distribution means,*

*wherein order information is applied to each of the plurality of printers;*

*wherein the status detection means detects a remaining amount of an expendable supply in each of the printers; and*

*wherein the image information distribution means distributes the image information to the plurality of printers in accordance with the order information and a detection result of the status detection means in order of the remaining amount of the expendable supply in each printer such that the image information is distributed first to one of the printers which has one of (i) the highest remaining amount of the expendable supply and (ii) the lowest remaining amount of the expendable supply.*

2. The apparatus according to claim 1, further comprising price option selecting means for selecting a price option for printing the image information;

wherein the advertisement mode is set based on the price option selected by a user.

3. The apparatus according to claim 1, wherein the image information includes a plurality of sets of unit image information;

wherein the print vending apparatus further comprises unit image selecting means for selecting a set of unit image information desired by [the] *a* user from the plurality of sets of the unit image information; and wherein the printing means prints the selected set of the unit image information on the sheet together with the advertisement image stored in the advertisement image storing means, when the advertisement information printing mode is set.

4. The apparatus according to claim 1, further comprising advertisement information receiving means for receiving advertisement information supplied from a remote site via a communication network;

wherein the advertisement information storing means stores the advertisement information received by the advertisement information receiving means.

5. The apparatus according to claim 1, further comprising:

[status detection means for detecting status of the printing means; and]

notification means for notifying a remote site of the status detected by the status detection means.

6. The apparatus according to claim 1, wherein the image information includes a plurality of sets of unit image information;

wherein the print vending apparatus further comprises unit image selecting means for selecting a plurality of sets of unit image information desired by the user from the plurality of sets of the unit image information; and wherein the image information distribution means distributes the selected unit image information sets to at least one of the plural printers in accordance with a selecting order of the sets of unit image information.

[7. The apparatus according to claim 5, further comprising ejecting means for conveying a sheet on which the image information is printed by any of the plurality of printers to eject the sheet through the outlet of the case.]

8. The apparatus according to claim 1, wherein the media accepting means comprises an attachment for accepting the recording medium, wherein the attachment is slanted such that an opening of the attachment is directed downward.

9. The apparatus according to claim 1, wherein the plurality of printers comprise a plurality of sublimation thermal printers.

10. A photographic print vending apparatus comprising:

a case having [an] *a single* outlet;

media accepting means for accepting a removable recording medium having photographic [print] *image* information stored thereon;

[print] *image* information reading means for reading the [print] *image* information from the recording medium;

a plurality of printers, each of which is adapted to print at least one image on at least one sheet in accordance with the [print] *image* information read from the recording medium; [and]

*status detection means for detecting a status of each of the plurality of printers;*

[print] *image* information distribution means for distributing [the print] *image* information [read from the recording medium to at least one of the plurality of printers in accordance with a predetermined sequence, wherein if the print information comprises print information to be printed on a plurality of sheets, a plurality of the printers are assigned to print respective ones of the sheets in accordance with the predetermined sequence;] *corresponding to a plurality of sheets on a single sheet by single sheet basis, regardless of a number of sheets to be printed and without regard to a number of sheets to be allocated to each printer, to the plurality of printers by switching assignment of the plurality of printers based on a predetermined sequence, so that if one sheet in the plurality of sheets is assigned to one printer, a next sheet in the plurality of sheets is always assigned to another*

*printer, wherein said one printer and said another printer are different from each other; and*

*conveyance means for collectively conveying printed sheets output by the plurality of printers to the single outlet, and ejecting the printed sheets to outside from the single outlet;* wherein each of the plurality of printers comprises image data generating means for generating image data to be printed based on the [print] *image* information distributed by the [print] *image* information distribution means, and printing means for printing the generated image data onto a sheet; [and]

*wherein order information is applied to each of the plurality of printers;*

*wherein the status detection means detects a remaining amount of an expendable supply in each of the printers;*

*wherein the image information distribution means distributes the image information to the plurality of printers in accordance with the order information and a detection result of the status detection means in order of the remaining amount of the expendable supply in each printer such that the image information is distributed first to one of the printers which has one of (i) the highest remaining amount of the expendable supply and (ii) the lowest remaining amount of the expendable supply; and* wherein [each sheet] *the sheets* with the image data printed thereon [is] *are collectively* output through the *single* outlet of the case.

[11. The apparatus according to claim 10, further comprising status detection means for detecting a status of each of the plurality of printers;

wherein the print information distribution means distributes the print information in accordance with detection results of the status detection means.]

[12. The apparatus according to claim 11, wherein the status detection means detects a remaining amount of an expendable supply in each of the printers; and wherein the print information distribution means distributes the print information to printers having a detected remaining amount of the expendable supply have enough remainders for printing.]

[13. The apparatus according to claim 11, wherein order information is applied to each of the plural printers;

wherein the status detection means detects a remaining amount of an expendable supply in each of the printers; and wherein the print information distribution means distributes the print information to the plurality of printers in accordance with the order information and a detection result of the status detection means in order of the remaining amount of the expendable supply in each printer such that the print information is distributed first to one of the printers which has the lowest remaining amount the expendable supply.]

14. The apparatus according to claim [11] *10*, wherein [the status detection means detects a remaining amount of an expendable supply in each of the printers, and] the print vending apparatus further comprises:

print quantity designation means for designating a print quantity desired by a user;

remaining amount comparing means for comparing a required amount of the expendable supply necessary for the designated print quantity with the detected remaining amount of the expendable supply in each of the printers; and warning means for warning of a print capacity shortage when the remaining amount comparing means determines that the remaining amount of the expendable supply is less than the required amount.

15. The apparatus according to claim 14, wherein the print quantity designation means designates *the* print quantity by unit amount; and wherein the print vending apparatus further comprises designation canceling means for canceling the print quantity designation based on an output result of the remaining amount comparing means.

16. The apparatus according to claim 10, wherein the plural printers are grouped into a plurality of groups of at least one of the printers; and wherein the [print] *image* information distribution means distributes the [print] *image* information to [the at least one of] the printers by group.

17. The apparatus according to claim 10, wherein the plurality of printers print the image data on different types of sheets;

wherein the print vending apparatus [comprise] *comprises* sheet selecting means for selecting one of the sheet types desired by a user; and the [print] *image* information distribution means distributes the [print] *image* information to [the at least one of] the printers based on the sheet type selected by the sheet selecting means.

18. The apparatus according to claim 10, further comprising:

[status detection means for detecting a status of each of the plurality of printers; and]

notification means for notifying a remote site of the detected status.

19. The apparatus according to claim 18, wherein each of the plurality of printers has respective identification information; and wherein the notification means notifies the remote site of the detected status together with the identification information of the corresponding printer.

[20. The apparatus according to claim 10, further comprising ejecting means for conveying a sheet on which the image data is printed by any of the plurality of printers to eject the sheet through the outlet of the case.]

21. The apparatus according to claim 10, wherein the plurality of printers comprise a plurality of sublimation thermal printers.

22. The apparatus according to claim 21, wherein each of the plurality of printers comprises property storage means for storing property information relating to a thermal print head property, and the print vending apparatus comprises:

property reading means for reading the property information stored in the property storage means of each printer; and power supply means for controlling a supply of power to the plurality of printers in accordance with the property information of each printer read by the property reading means.

23. A print vending apparatus comprising:

a case having [an] *a single* outlet;

a processor; and a plurality of printers connected to the processor, wherein each of the printers comprises: (i) an image *data* former which generates image data to be printed based on [print] *image* information, and (ii) a printing unit for printing the generated image data on a sheet;

wherein the [print] *image* information is input to the processor, and the processor distributes [the] received [print] *image* information [to at least one of the plurality of printers in accordance with a predetermined sequence, wherein if the print information comprises print information to be printed on a plurality of sheets, a plurality of the printers are assigned to print respective ones of the sheets in accordance with the predetermined sequence;] *corresponding to a plurality of sheets on a single sheet by single sheet basis, regardless of a number of sheets to be printed and without regard to a number of sheets to be allocated to each printer, to the plurality of printers by switching assignment of the plurality of printers based on a predetermined sequence, so that if one sheet in the plurality of sheets is assigned to one printer, a next sheet in the plurality of sheets is always assigned to another printer, wherein said one printer and said another printer are different from each other;*

*wherein the processor detects a status of each of the plurality of printers and a remaining amount of an expendable supply in each of the printers;*

*wherein order information is applied to each of the plurality of printers;*

*wherein the image information is distributed to the plurality of printers in accordance with the order information and a status detection result in order of the remaining amount of the expendable supply in each printer such that the image information is distributed first to one of the printers which has one of (i) the highest remaining amount of the expendable supply and (ii) the lowest remaining amount of the expendable supply; and* wherein [each printed sheet is] *the printed sheets are collectively* outputted through *the single* outlet of the case.

[24. The apparatus according to claim 23, wherein the processor detects status in each of the printers, and distributes the print information to the at least one of the plurality of printers in accordance with the detected status.]

25. The apparatus according to claim 23, wherein the plurality of printers are grouped into a plurality of groups of at least one printer; and wherein the processor distributes the [print] *image* information to the [at least one printer] *printers* by group.

26. A method of operating a print vending machine [for printing image information on a sheet with at least one of] *including* a plurality of printers, said method comprising:

detecting a status of each of the plurality of printers and a remaining amount of an expendable supply in each of the printers;

applying order information to each of the plurality of printers;

distributing input [print] *image* information [to at least one of the plurality of printers in accordance with a predetermined sequence, wherein if the print information comprises print information to be printed on a plurality of sheets, a plurality of the printers are assigned to print respective ones of the sheets in accordance with the predetermined sequence] *corresponding to a plurality of sheets on a single sheet by single sheet basis, regardless of a number of sheets to be printed and without regard to a number of sheets to be allocated to each printer, to the plurality of printers by switching assignment of the plurality of printers based on a predetermined sequence, so that if one sheet in the plurality of sheets is assigned to one printer, a next sheet in the plurality of sheets is always assigned to another printer, wherein said one printer and said another printer are different from each other, and wherein the image information is distributed to the plurality of printers in accordance with the order information and a status detection result in order of the remaining amount of the expendable supply in each printer such that the image information is distributed first to one of the printers which has one of (i) the highest remaining amount of the expendable supply and (ii) the lowest remaining amount of the expendable supply;* generating image data to be printed in *each of* the [at least one printer] *printers* to which the [print] *image* information is distributed;

printing the generated image data on [the] *a* sheet with a printing mechanism in *each of* the [printer] *printers* which generates the image data; and

*collectively* outputting each sheet printed by the plurality of printers through [an] *a single* outlet of the print vending machine.

27. A photographic print vending apparatus comprising:

a case having [an] *a single* outlet;

accepting means for accepting a memory storing photographic [print] *image* information;

photographic information reading means for reading the photographic *image* information from the memory;

a plurality of printers, each of which is adapted to print at least one image on at least one sheet in accordance with the photographic *image* information read from the memory; [and]

*status detection means for detecting a status of each of the plurality of printers;*

[print] *image* information distribution means for distributing [the print] *image* information [read from the memory to at least one of the plurality of printers in accordance with a predetermined sequence, wherein if the print information comprises print information to be printed on a plurality of sheets, a plurality of the printers are assigned to print respective ones of the sheets in accordance with the predetermined sequence;] *corresponding to a plurality of sheets on a single sheet by single sheet basis, regardless of a number of sheets to be printed and without regard to a number of sheets to be allocated to each printer, to the plurality of printers by switching assignment of the plurality of printers based on a predetermined sequence, so that if one sheet in the plurality of sheets is assigned to one printer, a next sheet in the plurality of sheets is always assigned to another printer, wherein said one printer and said another printer are different from each other; and*

*conveyance means for collectively conveying printed sheets output by the plurality of printers to the single outlet, and ejecting the printed sheets to outside from the single outlet;* wherein each of the plurality of printers comprises image data generating means for generating image data to be printed based on the photographic image information distributed by the [print] *image* information distribution means, and printing means for printing generated image data onto a sheet; [and]

*wherein order information is applied to each of the plurality of printers;*

*wherein the status detection means detects a remaining amount of an expendable supply in each of the printers;*

*wherein the image information distribution means distributes the image information to the plurality of printers in accordance with the order information and a detection result of the status detection means in order of the remaining amount of the expendable supply in each printer such that the image information is distributed first to one of the printers which has one of (i) the highest remaining amount of the expendable supply and (ii) the lowest remaining amount of the expendable supply; and* wherein [each sheet] *the sheets* with the image data printed thereon [is] *are collectively* output through the *single* outlet of the case.

28. A print vending apparatus comprising:

a case having [an] *a single* outlet;

an accepting unit which accepts a memory storing image information;

an image information reader which reads the image information from the memory;

an information storage unit which stores second image information;

a processor connected to the image information reader and the information storage unit; and a plurality of printers which print images on a sheet based on image data supplied from the processor;

wherein, when an information printing mode is set, the processor reads the second image information from the information storage unit, synthesizes the read second image information and the image information read by the image information reader, and distributes [the] synthesized information [to the printers as image data in accordance with a predetermined sequence, wherein if the image information comprises image information to be printed on a plurality of sheets, a plurality of the printers are assigned to print respective ones of the sheets in accordance with the predetermined sequence] *corresponding to a plurality of sheets on a single sheet by single sheet basis, regardless of a number of sheets to be printed and without regard to a number of sheets to be allocated to each printer, to the plurality of printers by switching assignment of the plurality of printers based on a predetermined sequence, so that if one sheet in the plurality of sheets is assigned to one printer, a next sheet in the plurality of sheets is always assigned to another printer, wherein said one printer and said another printer are different from each other*; [and]

*wherein the processor detects a status of each of the plurality of printers and a remaining amount of an expendable supply in each of the printers, and applies order information to each of the plurality of printers;*

*wherein the image information is distributed to the plurality of printers in accordance with the order information and a status detection result in order of the remaining amount of the expendable supply in each printer such that the image information is distributed first to one of the printers which has one of (i) the highest remaining amount of the expendable supply and (ii) the lowest remaining amount of the expendable supply; and* wherein [each printed sheet is] *the printed sheets are collectively* output through the *single* outlet of the case.

29. A print vending apparatus comprising:

a case having [an] *a single* outlet;

an accepting unit which accepts a memory storing image information;

an image information reader which reads the image information from the memory;

an advertisement information storage unit which stores advertisement information;

a processor connected to the image information reader and the advertisement information storage unit; and a plurality of printers which print images on a sheet based on image data supplied from the processor;

wherein the processor reads the advertisement information from the advertisement information storage unit, synthesizes the read advertisement information and the image information read by the image information reader, and distributes [the] synthesized information [to the printers as image data in accordance with a predetermined sequence, wherein if the image information comprises image information to be printed on a plurality of sheets, a plurality of the printers are assigned to print respective ones of the sheets in accordance with the predetermined sequence] *corresponding to a plurality of sheets on a single sheet by single sheet basis, regardless of a number of sheets to be printed and without regard to a number of sheets to be allocated to each printer, to the plurality of printers by switching assignment of the plurality of printers based on a predetermined sequence, so that if one sheet in the plurality of sheets is assigned to one printer, a next sheet in the plurality of sheets is always assigned to another printer, wherein said one printer and said another printer are different from each other*; [and]

*wherein the processor detects a status of each of the plurality of printers and a remaining amount of an expendable supply in each of the printers, and applies order information to each of the plurality of printers;*

*wherein the image information is distributed to the plurality of printers in accordance with the order information and a status detection result in order of the remaining amount of the expendable supply in each printer such that the image information is distributed first to one of the printers which has one of (i) the highest remaining amount of the expendable supply and (ii) the lowest remaining amount of the expendable supply; and* wherein [each printed sheet is] *the printed sheets are collectively* output through the *single* outlet of the case.

*30. A photographic print vending apparatus comprising:*

*a case having a single outlet;*

*media accepting means for accepting a removable recording medium having photographic image information stored thereon;*

*image information reading means for reading the image information from the recording medium;*

*a plurality of printers;*

*status detection means for detecting a status of each of the plurality of printers;*

*image information distribution means for distributing image information corresponding to a plurality of sheets on a single sheet by single sheet basis, regardless of a number of sheets to be printed and without regard to a number of sheets to be allocated to each printer, to the plurality of printers by switching assignment of the plurality of printers based on a predetermined sequence, so that if one sheet in the plurality of sheets is assigned to one printer, a next sheet in the plurality of sheets is always assigned to another printer, wherein said one printer and said another printer are different from each other; and*

*conveyance means for collectively conveying printed sheets output by the plurality of printers to the single outlet, and ejecting the printed sheets to outside from the single outlet;*

*wherein each of the plurality of printers comprises printing means for printing at least one image onto at least one sheet based on the image information distributed thereto;*

*wherein order information is applied to each of the plurality of printers;*

*wherein the status detection means detects a remaining amount of an expendable supply in each of the printers;*

*wherein the image information distribution means distributes the image information to the plurality of printers in accordance with the order information and a detection*

*result of the status detection means in order of the remaining amount of the expendable supply in each printer such that the image information is distributed first to one of the printers which has one of (i) the highest remaining amount of the expendable supply and (ii) the lowest remaining amount of the expendable supply; and*

*wherein the printed sheets are collectively output through the single outlet of the case.*

*31. A print vending apparatus comprising:*

*a case having a single outlet;*

*a processor; and*

*a plurality of printers connected to the processor, wherein each of the printers comprises a printing unit for printing an image on a sheet, and wherein order information is applied to each of the plurality of printers;*

*wherein the processor distributes image information corresponding to a plurality of sheets on a single sheet by single sheet basis, regardless of a number of sheets to be printed and without regard to a number of sheets to be allocated to each printer, to the plurality of printers by switching assignment of the plurality of printers based on a predetermined sequence, so that if one sheet in the plurality of sheets is assigned to one printer, a next sheet in the plurality of sheets is always assigned to another printer, wherein said one printer and said another printer are different from each other;*

*wherein the processor detects a status of each of the plurality of printers and a remaining amount of an expendable supply in each of the printers;*

*wherein the image information is distributed to the plurality of printers in accordance with the order information and a status detection result in order of the remaining amount of the expendable supply in each printer such that the image information is distributed first to one of the printers which has one of (i) the highest remaining amount of the expendable supply and (ii) the lowest remaining amount of the expendable supply; and*

*wherein the printed sheets are collectively output through the single outlet of the case.*

*32. A method of operating a print vending machine including a plurality of printers, said method comprising:*

*detecting a status of each of the plurality of printers and a remaining amount of an expendable supply in each of the printers;*

*applying order information to each of the plurality of printers;*

*distributing image information corresponding to a plurality of sheets on a single sheet by single sheet basis, regardless of a number of sheets to be printed and without regard to a number of sheets to be allocated to each printer, to the plurality of printers by switching assignment of the plurality of printers based on a predetermined sequence, so that if one sheet in the plurality of sheets is assigned to one printer, a next sheet in the plurality of sheets is always assigned to another printer, wherein said one printer and said another printer are different from each other, and wherein the image information is distributed to the plurality of printers in accordance with the order information and a status detection result in order of the remaining amount of the expendable supply in each printer such that the image information is distributed first to one of the printers which has one of (i) the highest remaining amount of the expendable supply and (ii) the lowest remaining amount of the expendable supply;*

*printing at least one image on at least one sheet by each printer to which the image information has been distributed, based on the image information distributed thereto; and*

*collectively outputting the sheets printed by the plurality of printers through a single outlet of the print vending machine.*

*33. A photographic print vending apparatus comprising:*

*a case having a single outlet;*

*media accepting means for accepting a removable recording medium having photographic image information stored thereon;*

*image information reading means for reading the image information from the recording medium;*

*print job forming means for forming a plurality of print jobs based on the image information read from the recording medium, each print job corresponding to one sheet to be printed;*

*a plurality of printers;*

*status detection means for detecting a status of each of the plurality of printers;*

*print job distribution means for distributing the plurality of the print jobs on a single sheet by single sheet basis, regardless of a number of sheets to be printed and without regard to a number of sheets to be allocated to each printer, to the plurality of printers by switching assignment of the plurality of printers based on a predetermined sequence, so that if one print job is assigned to one printer, a next print job is always assigned to another printer, wherein said one printer and said another printer are different from each other; and*

*conveyance means for collectively conveying printed sheets output by the plurality of printers to the single outlet, and ejecting the printed sheets to outside from the single outlet;*

*wherein each of the plurality of printers comprises printing means for printing an image onto a sheet in accordance with each print job distributed thereto;*

*wherein order information is applied to each of the plurality of printers;*

*wherein the status detection means detects a remaining amount of an expendable supply in each of the printers;*

*wherein the image information distribution means distributes the image information to the plurality of printers in accordance with the order information and a detection result of the status detection means in order of the remaining amount of the expendable supply in each printer such that the image information is distributed first to one of the printers which has one of (i) the highest remaining amount of the expendable supply and (ii) the lowest remaining amount of the expendable supply; and*

*wherein the printed sheets are collectively output through the single outlet of the case.*

*34. A print vending apparatus comprising:*

*a case having a single outlet;*

*a processor; and*

*a plurality of printers connected to the processor, wherein each of the printers comprises a printing unit for printing an image on a sheet in accordance with a received print job, and wherein order information is applied to each of the plurality of printers;*

*wherein the processor generates a plurality of print jobs, each corresponding to one sheet to be printed, based on input image information, and the processor distributes the plurality of print jobs on a single sheet by single sheet basis, regardless of a number of sheets to be printed and without regard to a number of sheets to be*

*allocated to each printer, to the plurality of printers by switching assignment of the plurality of printers based on a predetermined sequence, so that if one print job is assigned to one printer, a next print job is always assigned to another printer, wherein said one printer and said another printer are different from each other;*

*wherein the processor detects a status of each of the plurality of printers and a remaining amount of an expendable supply in each of the printers;*

*wherein the image information is distributed to the plurality of printers in accordance with the order information and a status detection result in order of the remaining amount of the expendable supply in each printer such that the image information is distributed first to one of the printers which has one of (i) the highest remaining amount of the expendable supply and (ii) the lowest remaining amount of the expendable supply; and*

*wherein the printed sheets are collectively outputted through the single outlet of the case.*

*35. A method of operating a print vending machine including a plurality of printers, said method comprising:*

*detecting a status of each of the plurality of printers and a remaining amount of an expendable supply in each of the printers;*

*applying order information to each of the plurality of printers;*

*preparing a plurality of print jobs based on input image information, each print ob corresponding to one sheet to be printed;*

*distributing the plurality of print jobs on a single sheet by single sheet basis, regardless of a number of sheets to be printed and without regard to a number of sheets to be allocated to each printer, to the plurality of printers by switching assignment of the plurality of printers based on a predetermined sequence, so that if one print job is assigned to one printer, a next print job is always assigned to another printer, wherein said one printer and said another printer are different from each other, and wherein the image information is distributed to the plurality of printers in accordance with the order information and a status detection result in order of the remaining amount of the expendable supply in each printer such that the image information is distributed first to one of the printers which has one of (i) the highest remaining amount of the expendable supply and (ii) the lowest remaining amount of the expendable supply;*

*printing an image on a sheet by each printer to which a print job has been distributed, in accordance with the print job distributed thereto; and*

*collectively outputting the sheets printed by the plurality of printers through a single outlet of the print vending machine.*

* * * * *